US009888298B2

(12) United States Patent
Suzuki et al.

(10) Patent No.: US 9,888,298 B2
(45) Date of Patent: Feb. 6, 2018

(54) SYSTEM, COMMUNICATIONS NODE, AND DETERMINING METHOD

(71) Applicant: FUJITSU LIMITED, Kawasaki-shi, Kanagawa (JP)

(72) Inventors: Takahisa Suzuki, Yokohama (JP);
Toshiya Otomo, Kawasaki (JP);
Hiromasa Yamauchi, Kawasaki (JP);
Koichiro Yamashita, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/152,613

(22) Filed: May 12, 2016

(65) Prior Publication Data
US 2016/0255423 A1  Sep. 1, 2016

Related U.S. Application Data

(63) Continuation of application No. PCT/JP2013/080942, filed on Nov. 15, 2013.

(51) Int. Cl.
*H04Q 9/00* (2006.01)
*H04W 4/00* (2009.01)
(Continued)

(52) U.S. Cl.
CPC .............. *H04Q 9/00* (2013.01); *H04W 4/008* (2013.01); *H04W 4/046* (2013.01);
(Continued)

(58) Field of Classification Search
CPC ........... H04Q 9/00; H04Q 4/008; H04Q 4/046
(Continued)

(56) References Cited

U.S. PATENT DOCUMENTS

2004/0249590 A1  12/2004  Ota et al.
2009/0109885 A1*  4/2009  Fonseca, Jr. .......... H04L 1/1825
370/311
(Continued)

FOREIGN PATENT DOCUMENTS

JP   2003-110749   4/2003
JP   2003-115093   4/2003
(Continued)

OTHER PUBLICATIONS

International Search Report and Written Opinion of the International Searching Authority (Form PCT/ISA/210, Form PCT/ISA/237), mailed in connection with PCT/JP2013/080942 and dated Dec. 10, 2013 (7 pages).
(Continued)

*Primary Examiner* — Omar Casillashernandez
(74) *Attorney, Agent, or Firm* — Fujitsu Patent Center

(57) ABSTRACT

A system includes communications nodes, respectively having a sensor; and a communications apparatus that simultaneously requests the communications nodes to transmit sensor data. A first communications node among the communications nodes, when determining that among a first state where the communications apparatus includes the first communications node when requesting transmission and a second state where the communications apparatus excludes the first communications node when requesting transmission, the first communications node is in the second state: determines whether a predetermined difference is present between a predetermined value and the sensor data of the first communications node, and transmits a notification signal that notifies the communications apparatus of the predetermined difference, when determining that the predetermined difference is present.

6 Claims, 29 Drawing Sheets

(51) Int. Cl.
*H04W 4/04* (2009.01)
*H04W 84/18* (2009.01)

(52) U.S. Cl.
CPC ... *H04Q 2209/40* (2013.01); *H04Q 2209/845* (2013.01); *H04Q 2209/886* (2013.01); *H04W 84/18* (2013.01)

(58) Field of Classification Search
USPC .................................................. 340/870.16
See application file for complete search history.

(56) References Cited

U.S. PATENT DOCUMENTS

| | | | |
|---|---|---|---|
| 2009/0210075 A1 | 8/2009 | Moriwaki | |
| 2010/0038440 A1* | 2/2010 | Ersavas | A01G 1/00 236/51 |
| 2010/0045422 A1 | 2/2010 | Teng et al. | |
| 2012/0128057 A1 | 5/2012 | Daecke et al. | |
| 2014/0159915 A1* | 6/2014 | Hong | H04Q 9/00 340/870.07 |

FOREIGN PATENT DOCUMENTS

| | | | |
|---|---|---|---|
| JP | 2005-100443 | | 4/2005 |
| JP | 2005-223497 | | 8/2005 |
| JP | 2007-300499 | | 11/2007 |
| JP | 2008-099074 | | 4/2008 |
| JP | 2009-055271 | | 3/2009 |
| JP | 2009055271 | * | 3/2009 |
| JP | 2009-206749 | | 9/2009 |
| JP | 2010-057072 | | 3/2010 |
| JP | 2010-074818 | | 4/2010 |
| JP | 2011-176630 | | 9/2011 |
| JP | 2011176630 | * | 9/2011 |
| JP | 2011-199544 | | 10/2011 |
| JP | 2012-114908 | | 6/2012 |
| JP | 2012-165249 | | 8/2012 |
| JP | 2013-172179 | | 9/2013 |
| JP | 2013172179 | * | 9/2013 |
| WO | 2006-090480 | | 8/2006 |

OTHER PUBLICATIONS

Taiwanese Office Action dated Oct. 27, 2015 corresponding to Taiwan Patent Application No. 103139345, partial English translation (13 pages).

JPOA—Office Action of Japanese Patent Application No. 2015-547358 dated Jun. 6, 2017 with full machine translation of the Office Action.

* cited by examiner

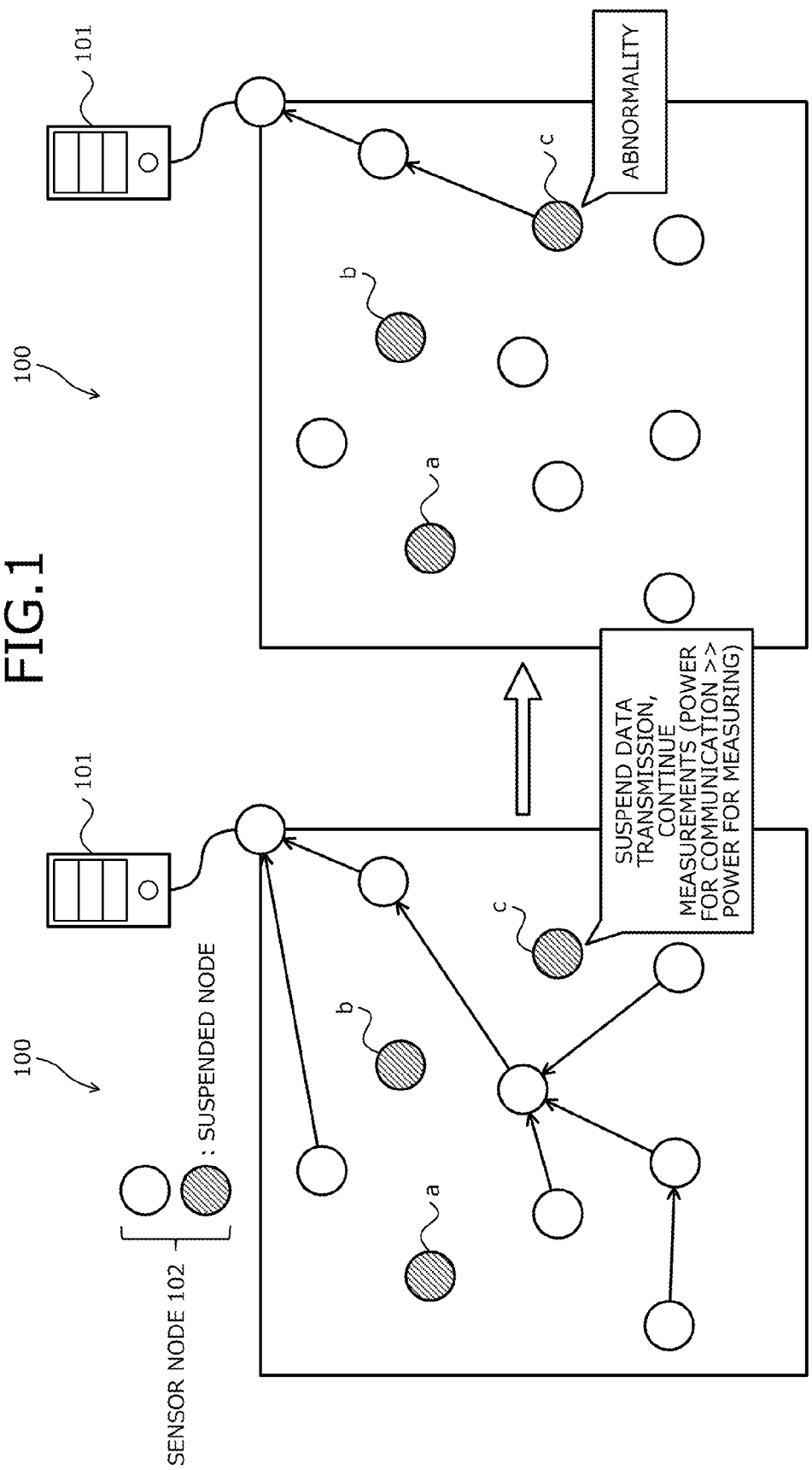

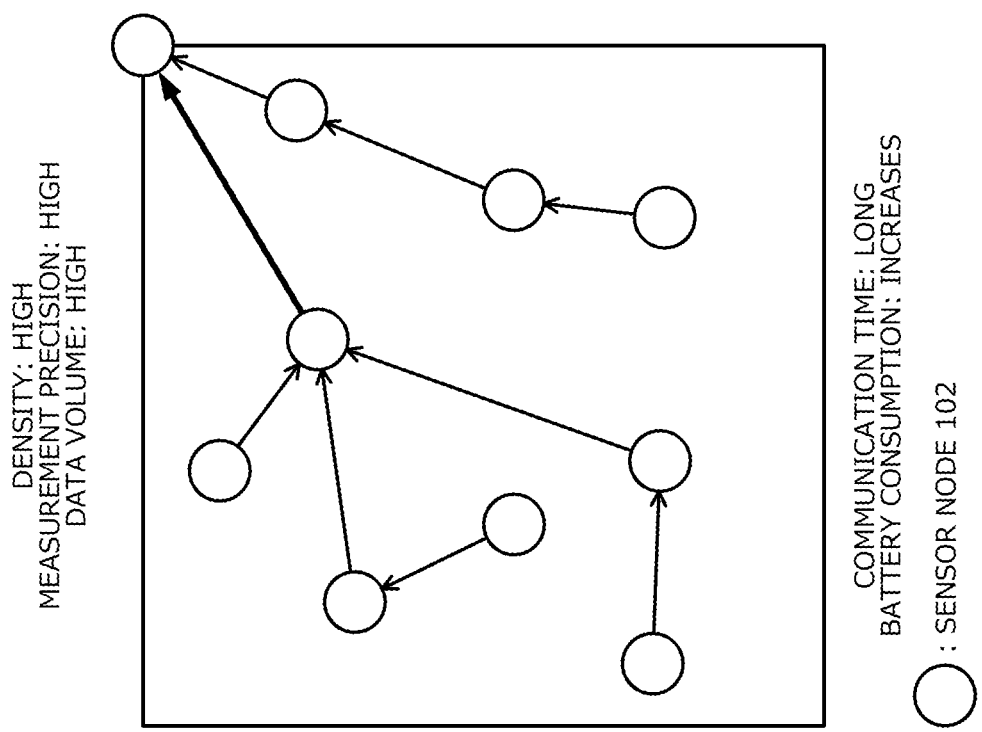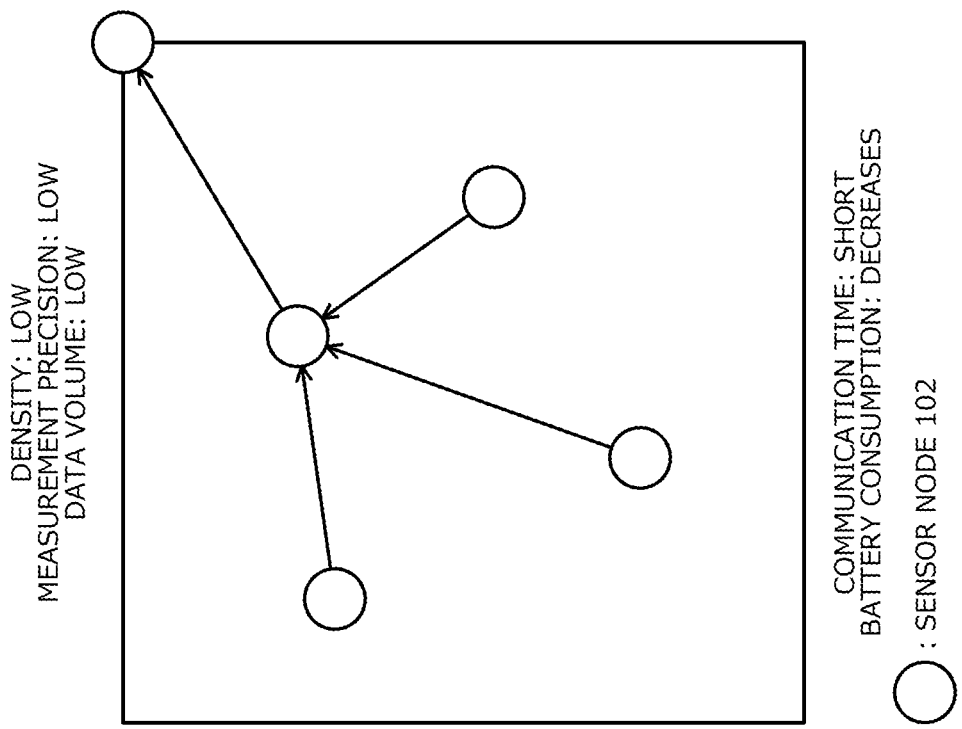

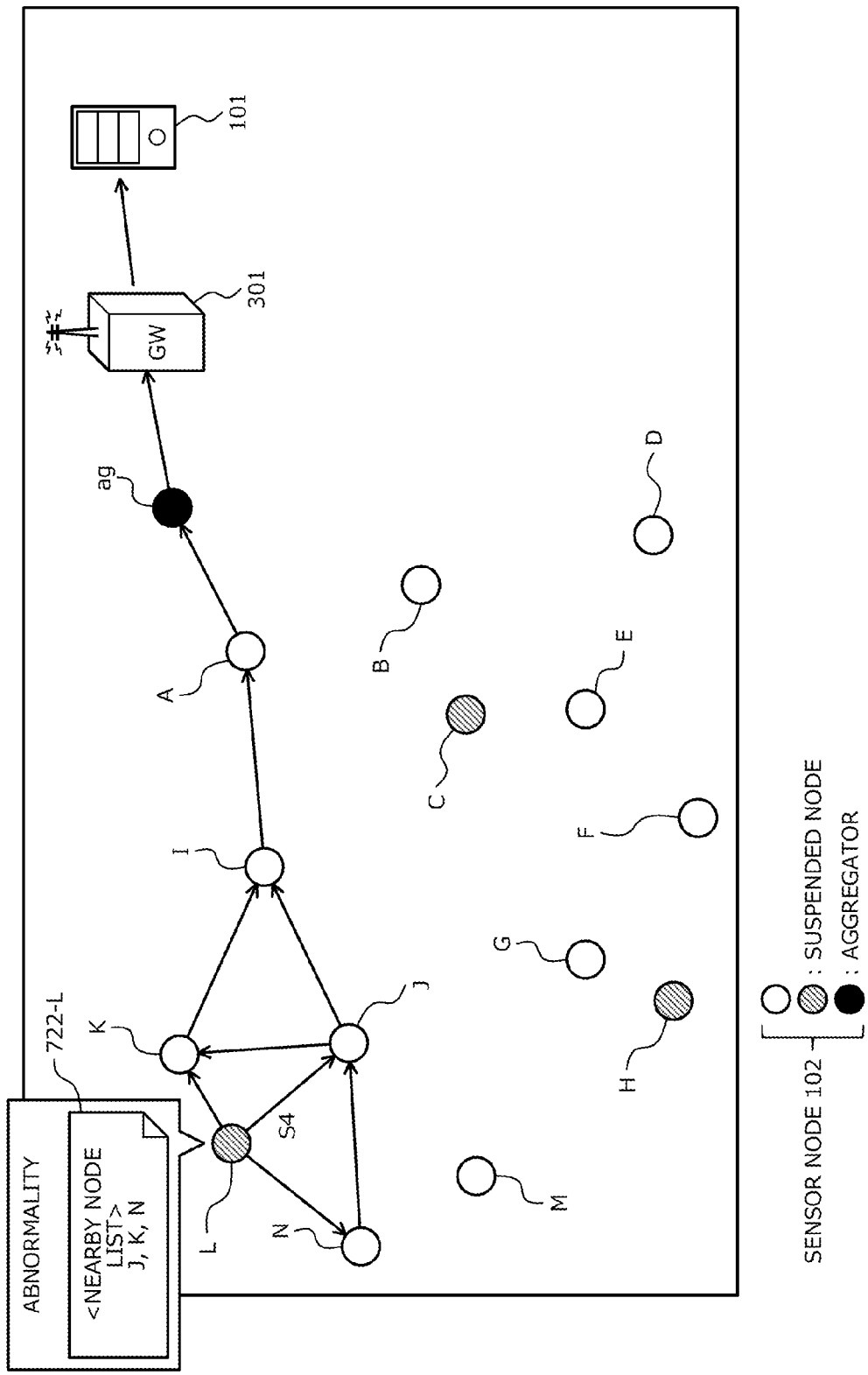

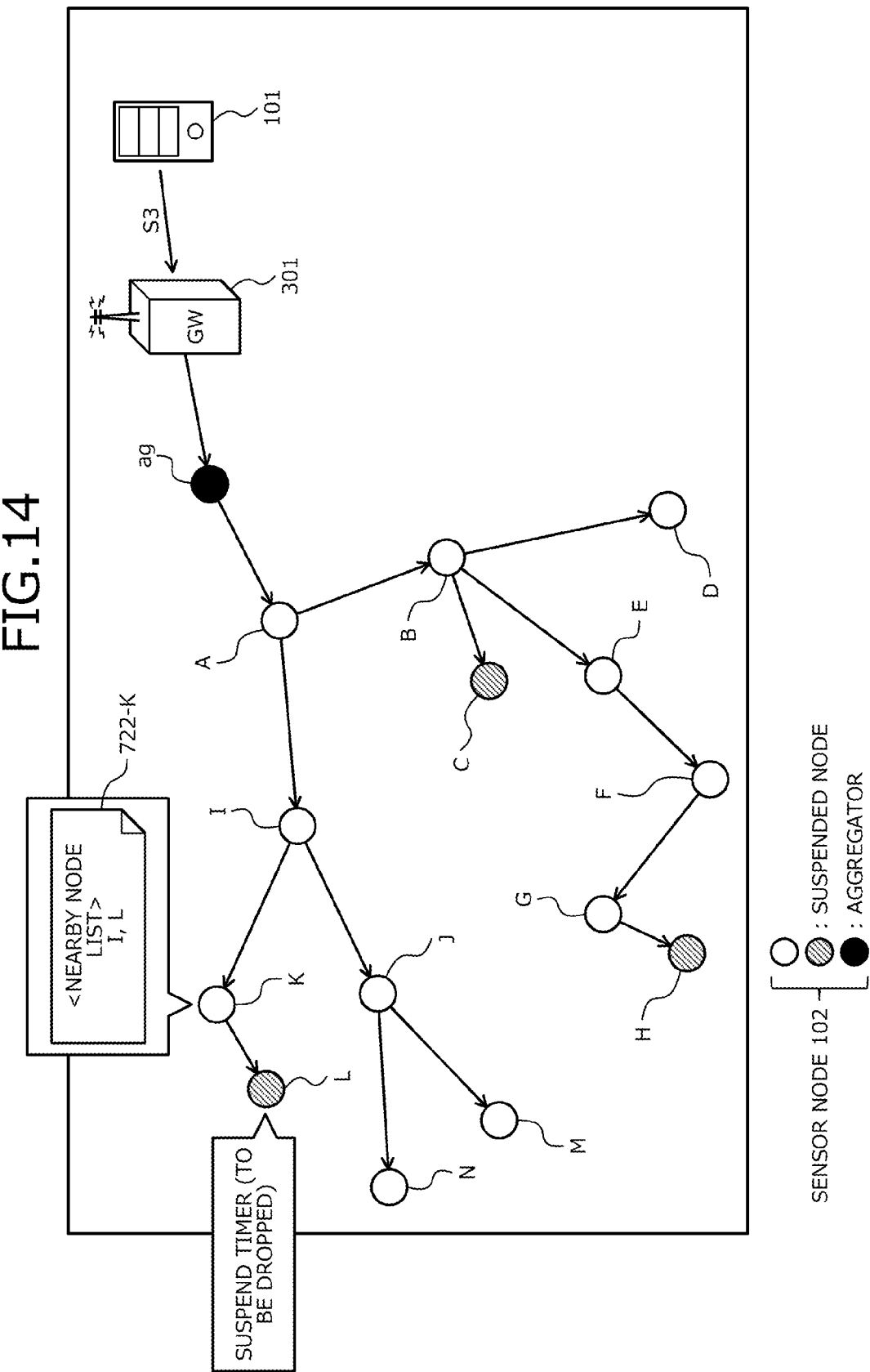

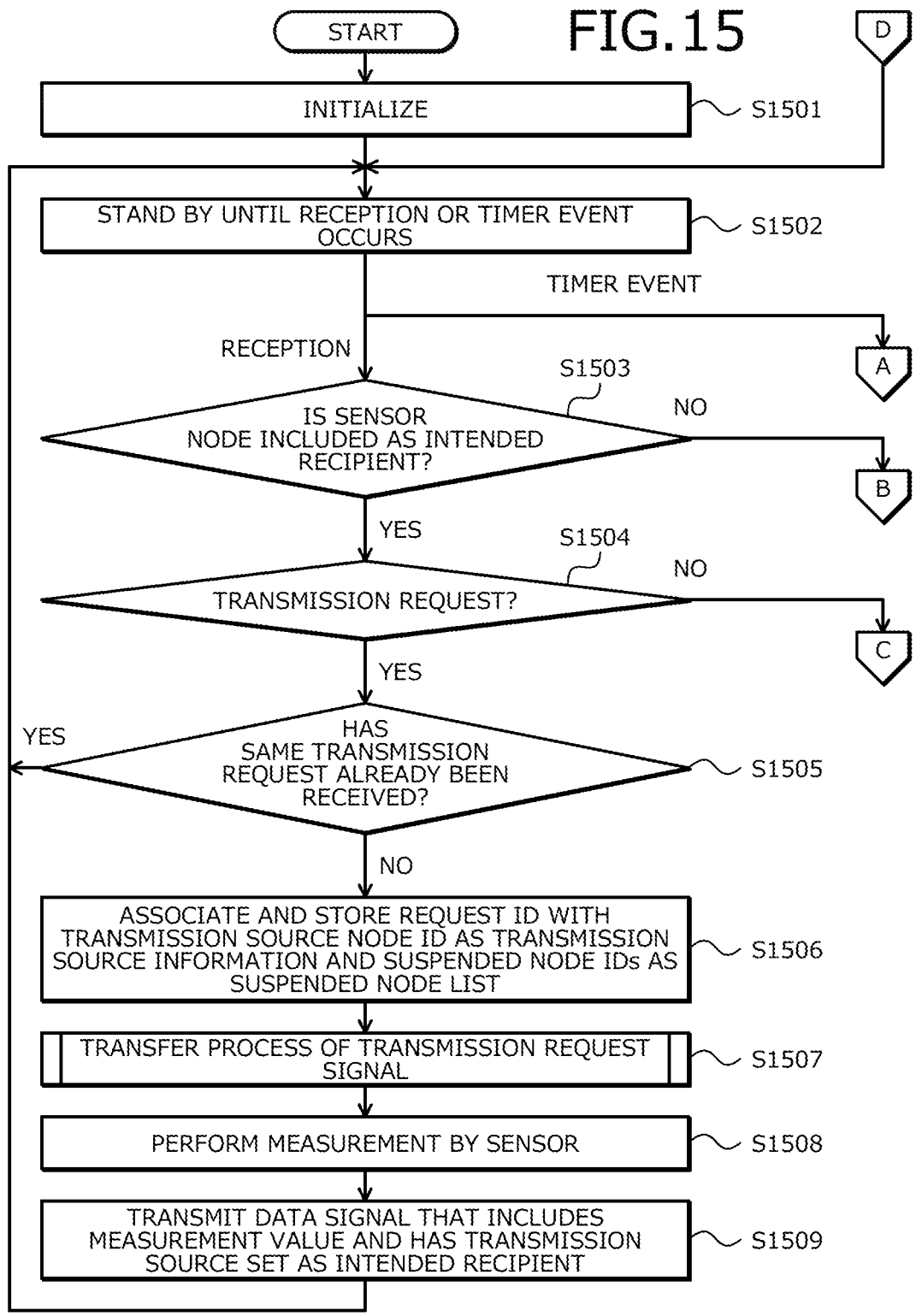

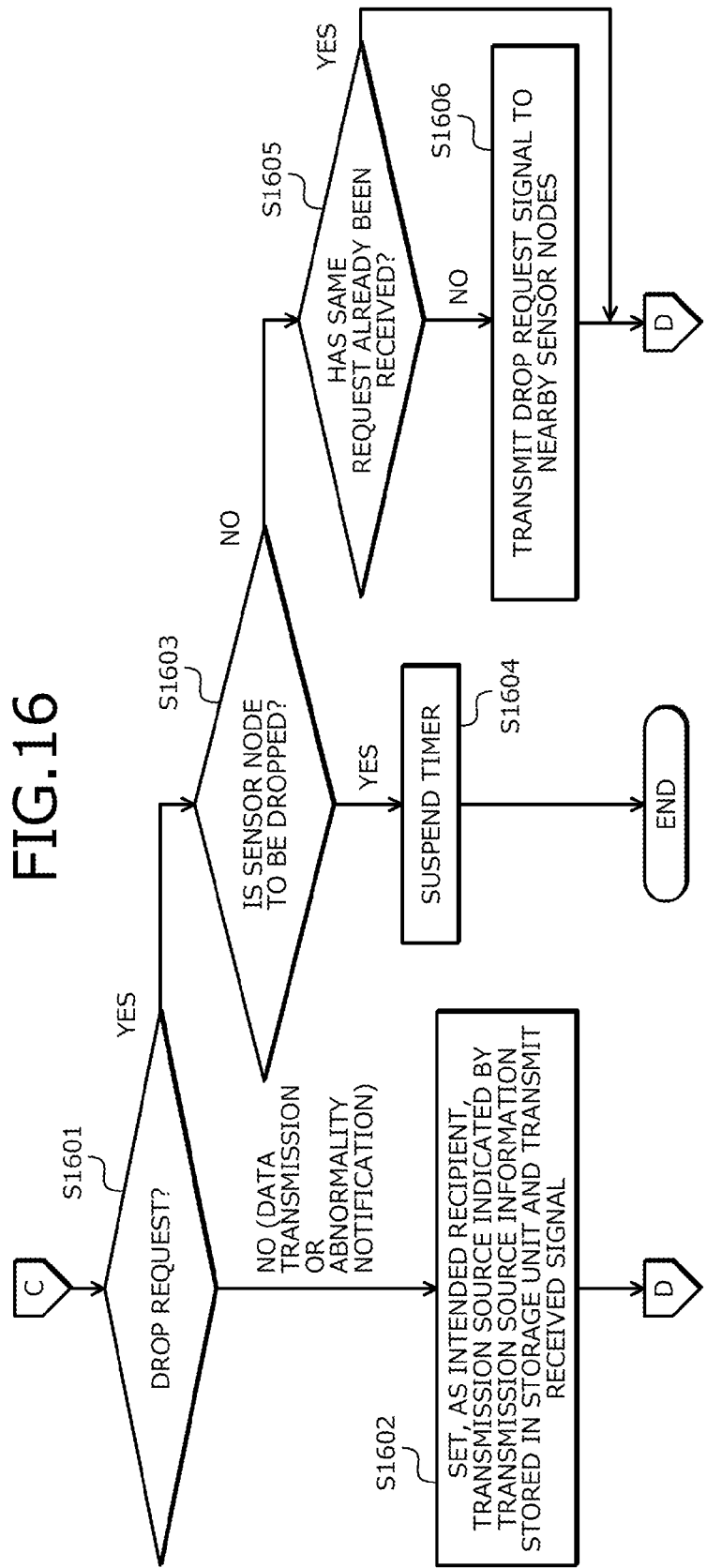

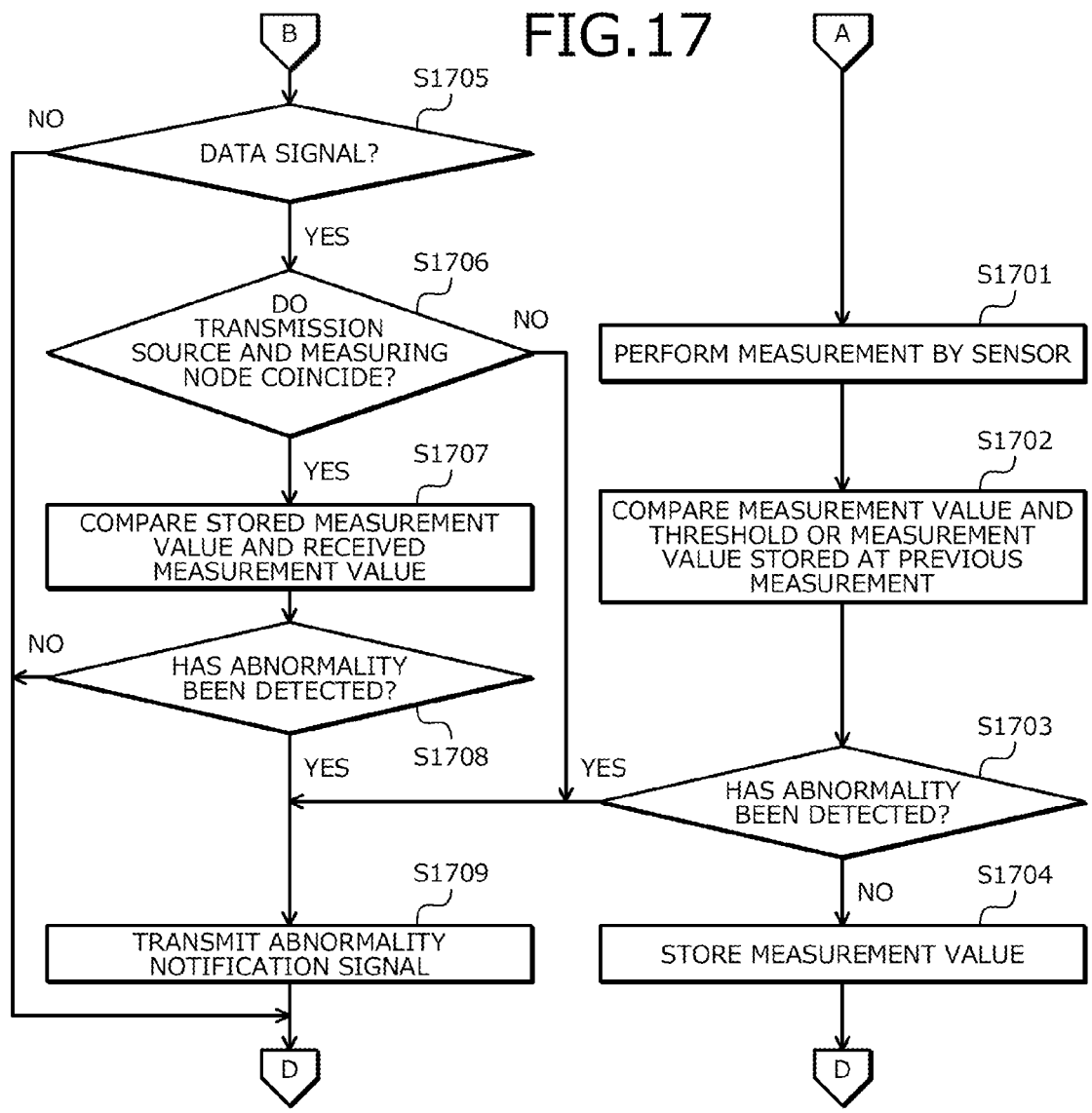

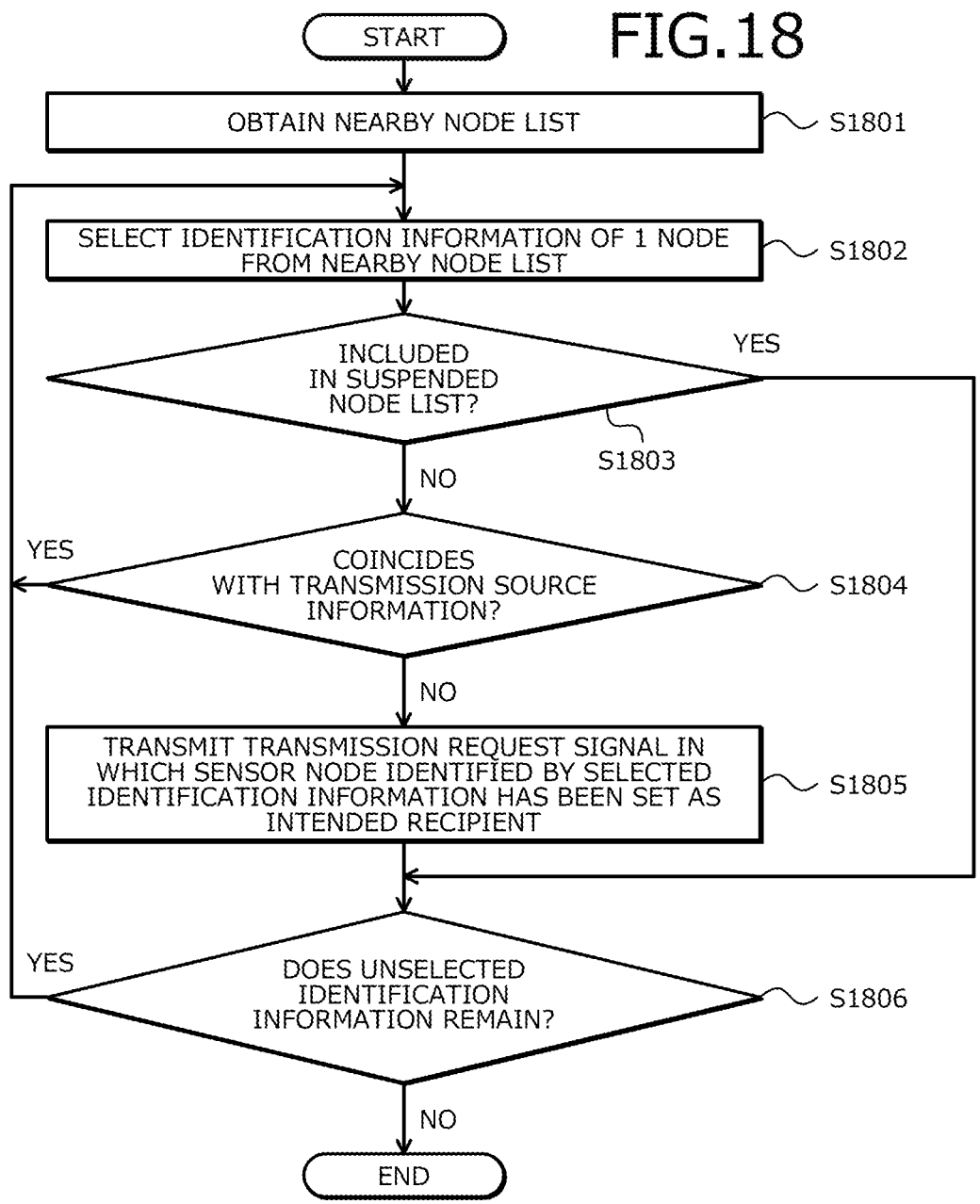

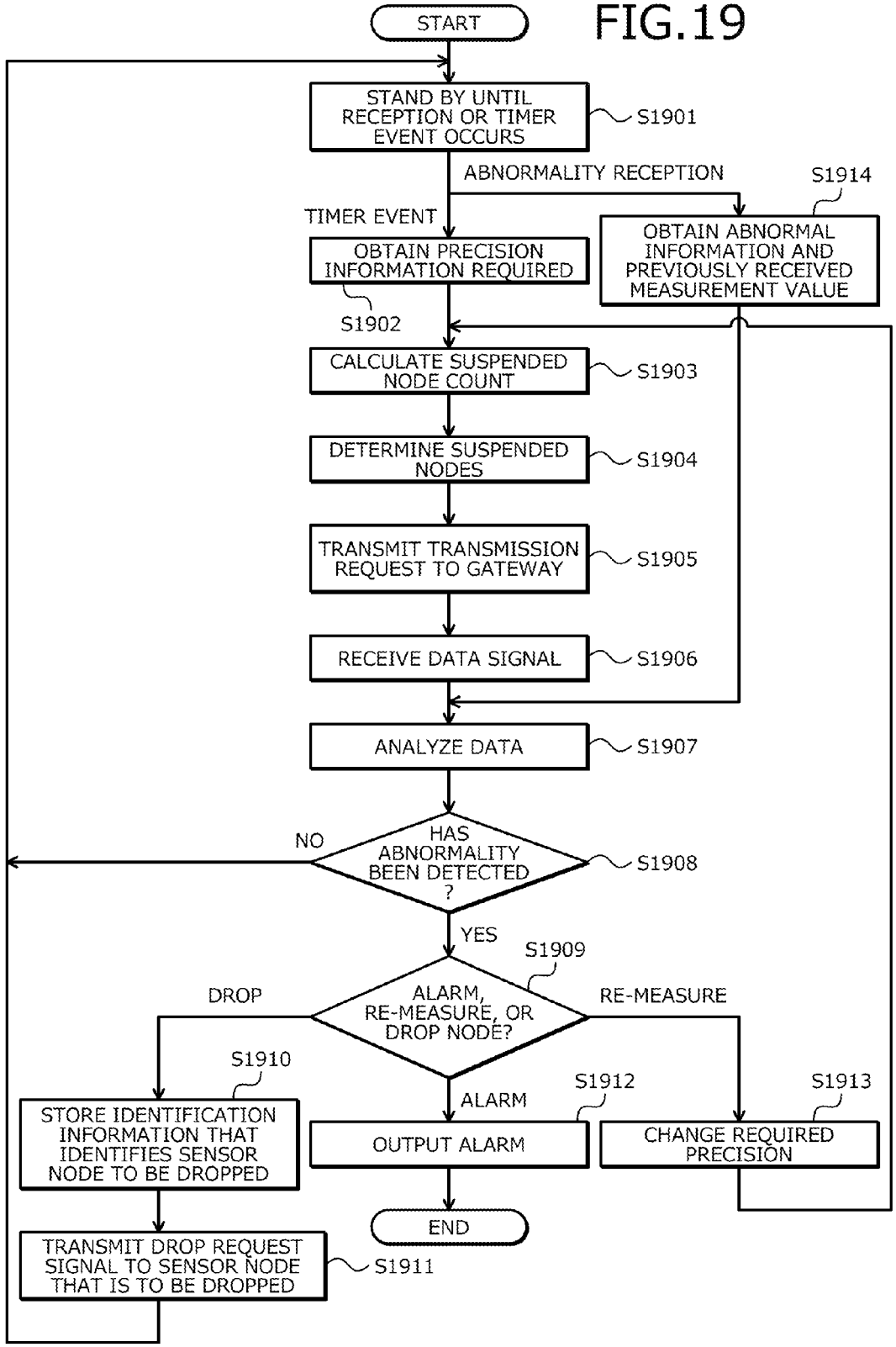

FIG.20

| | INTENDED RECIPIENT | TRANSMISSION SOURCE | SIGNAL TYPE | | | DATA | |
|---|---|---|---|---|---|---|---|
| FUNDAMENTAL FORMAT | | | | | | | |
| TRANSMISSION REQUEST SIGNAL S1 | INTENDED RECIPIENT | TRANSMISSION SOURCE | TRANSMISSION REQUEST | REQUEST ID | | | |
| DATA SIGNAL S2 | INTENDED RECIPIENT | TRANSMISSION SOURCE | DATA TRANSMISSION | MEASURING NODE ID | DATA SIZE/TYPE | MEASUREMENT VALUE | |
| DROP REQUEST SIGNAL S3 | INTENDED RECIPIENT | TRANSMISSION SOURCE | DROP REQUEST | REQUEST ID | DROP NODE ID | | |
| SUSPENSION REQUEST SIGNAL S5 | INTENDED RECIPIENT | TRANSMISSION SOURCE | SUSPENSION REQUEST | REQUEST ID | SUSPENDED NODE ID | SUSPENSION PERIOD | |
| ABNORMALITY NOTIFICATION SIGNAL S4 | BROADCAST | TRANSMISSION SOURCE | ABNORMALITY DETECTION | DETECTED NODE ID | DATA SIZE/TYPE | DETECTED VALUE | |

VARIES WITH EACH HOP

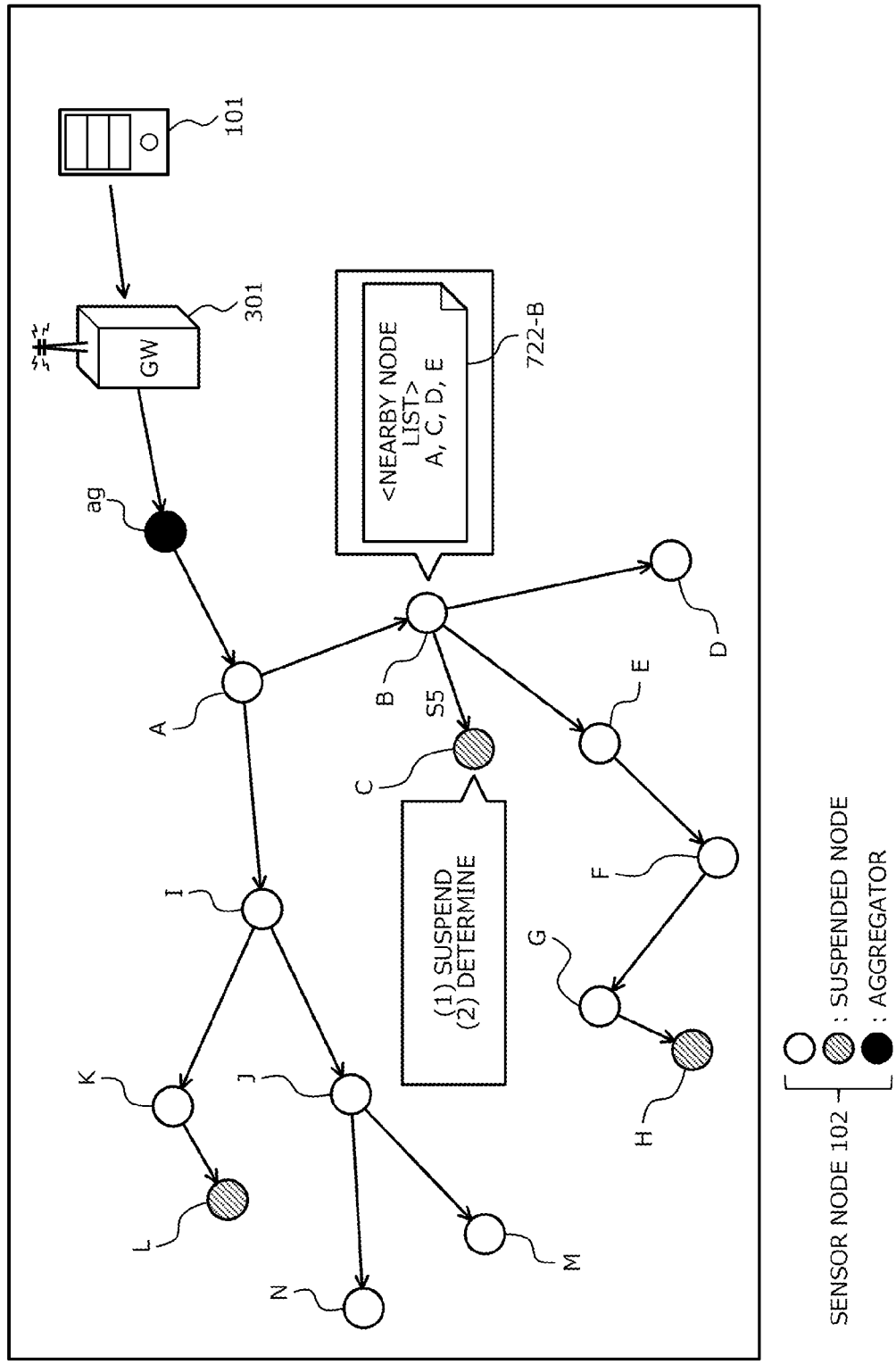

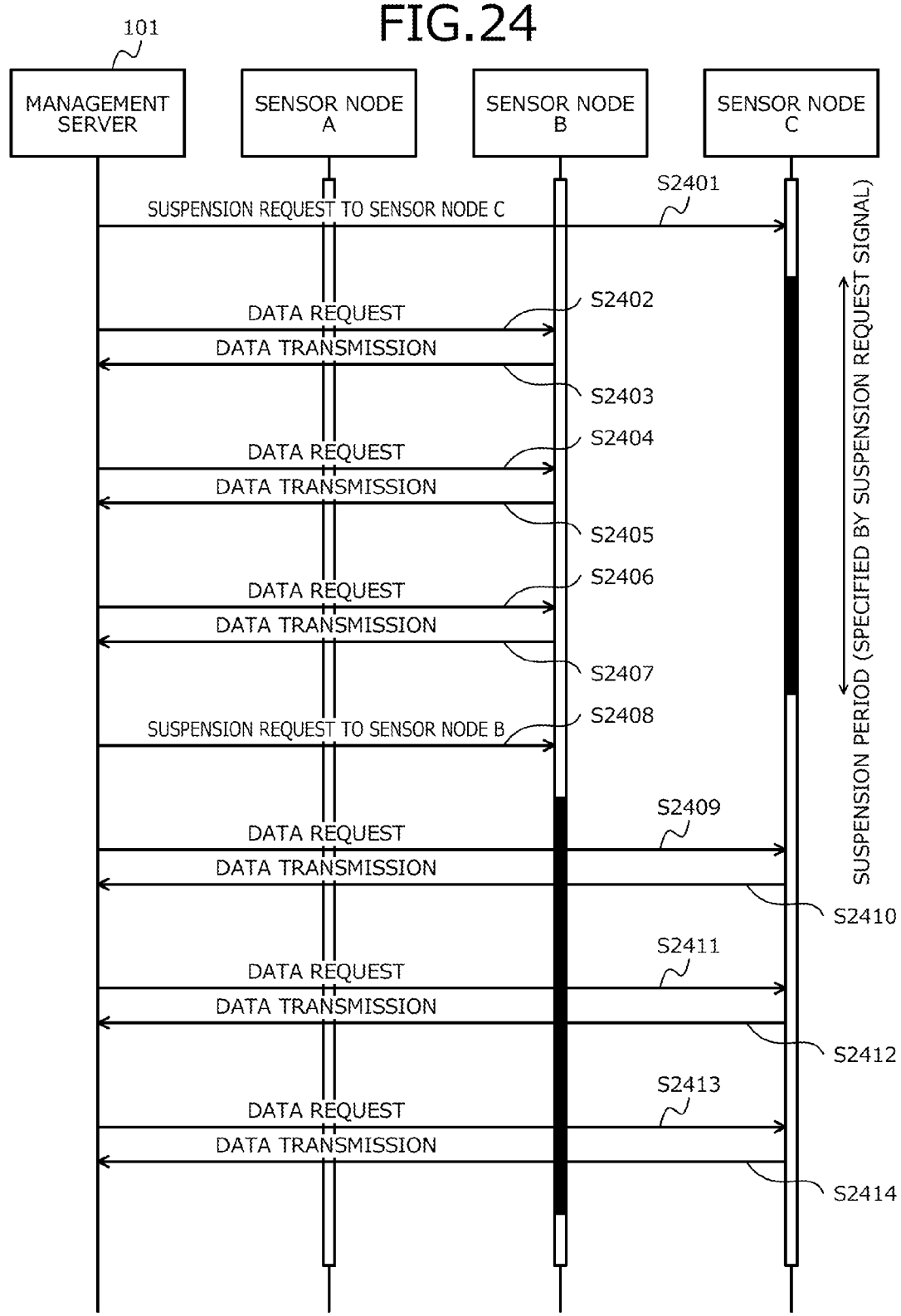

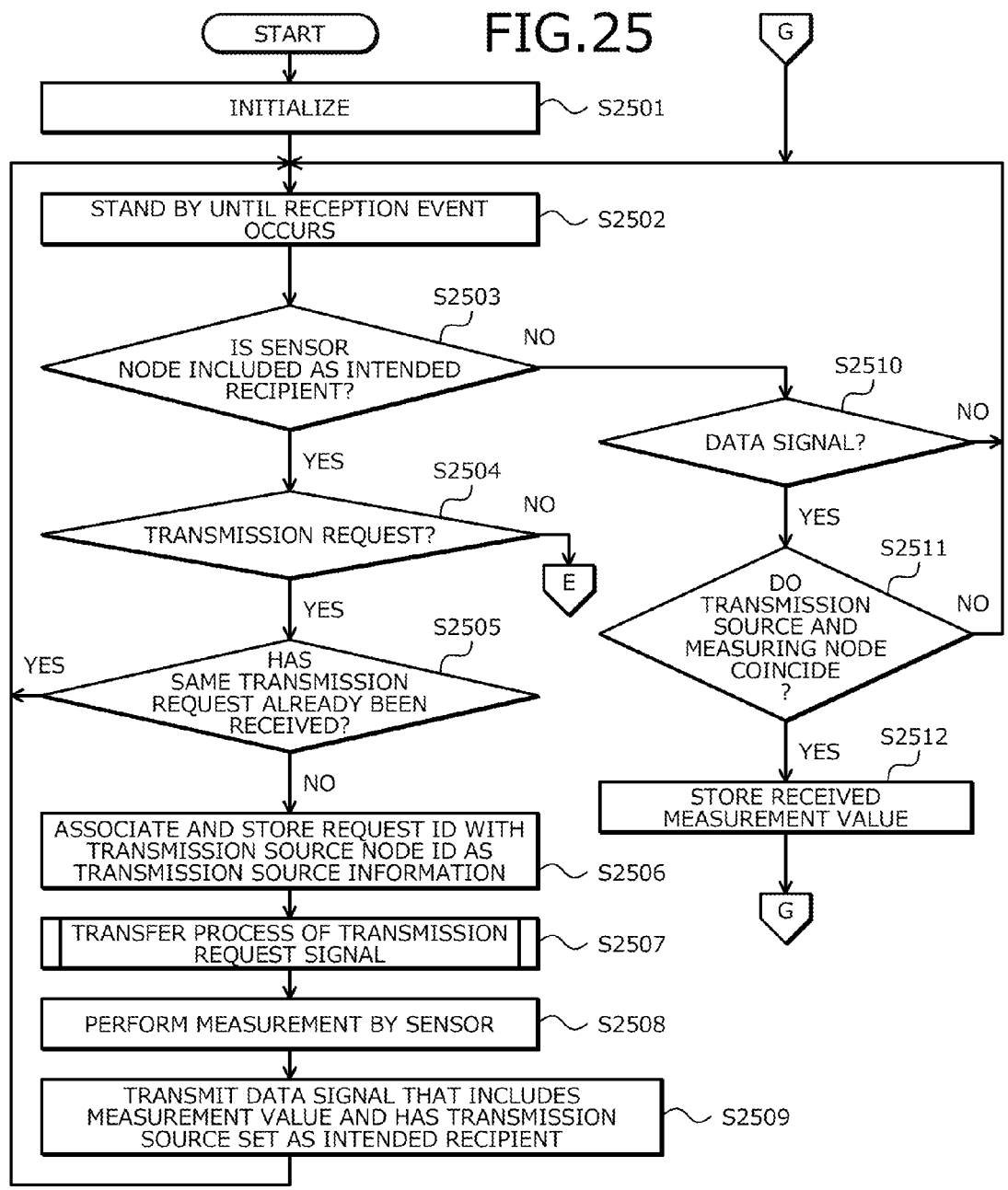

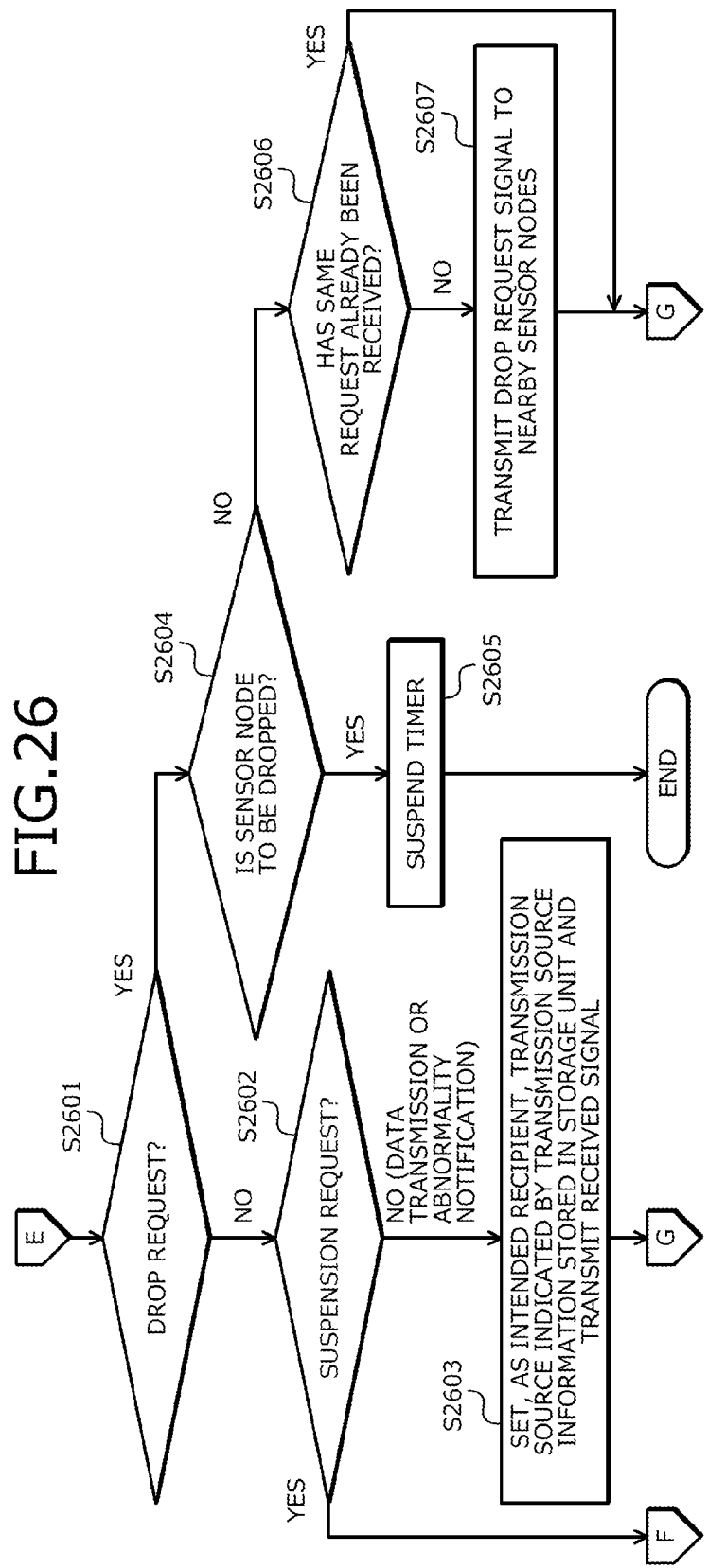

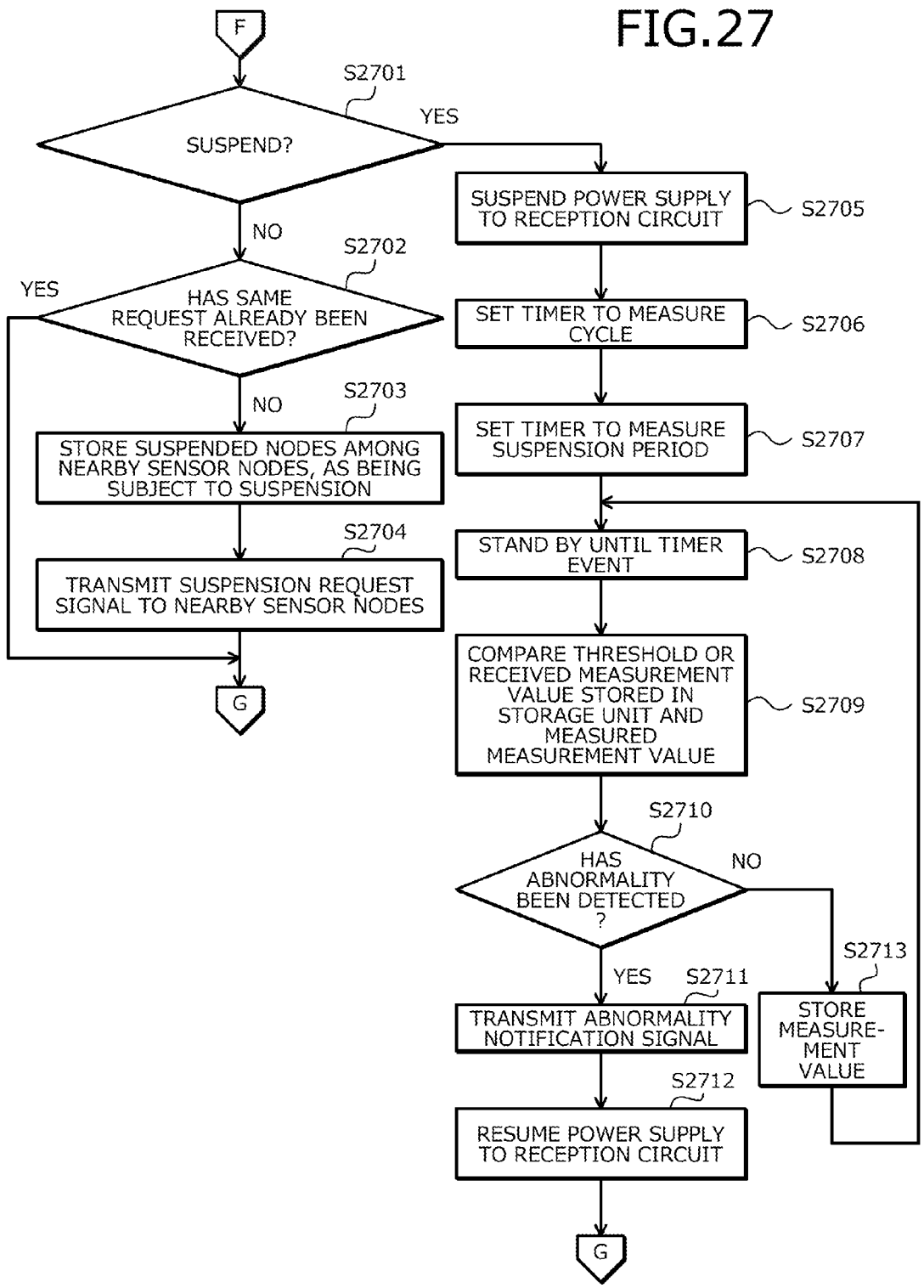

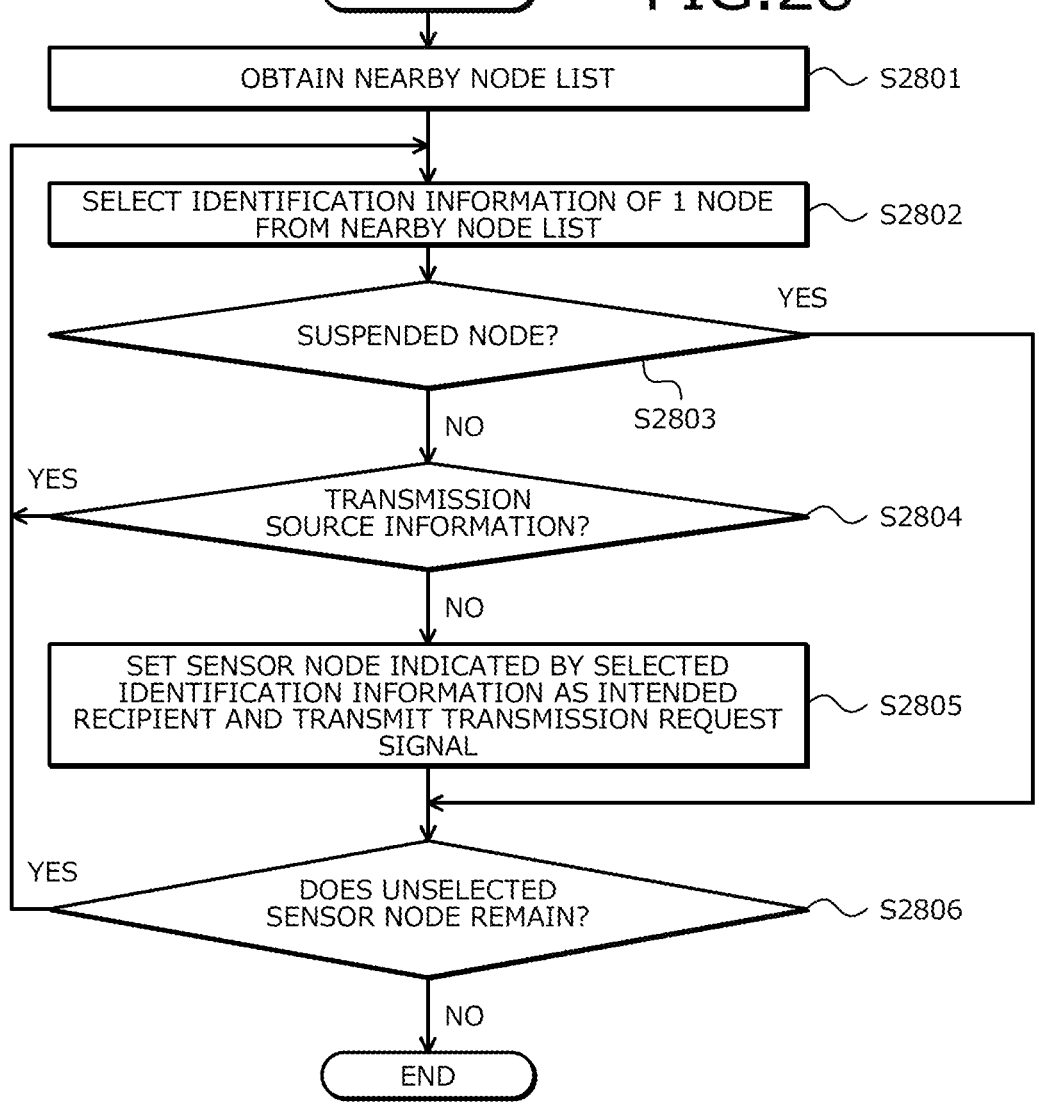

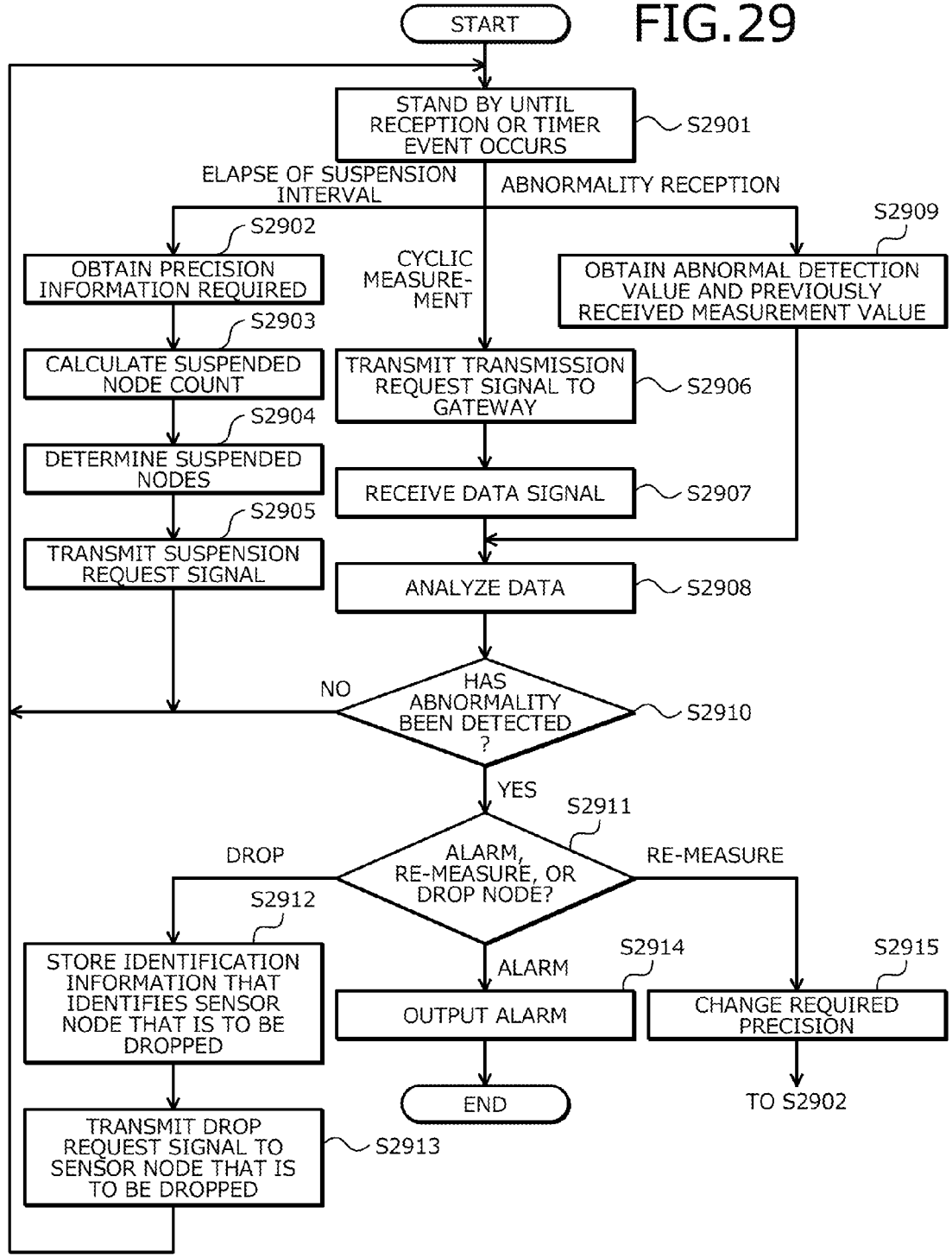

SYSTEM, COMMUNICATIONS NODE, AND DETERMINING METHOD

CROSS REFERENCE TO RELATED APPLICATIONS

This application is a continuation application of International Application PCT/JP2013/080942, filed on Nov. 15, 2013 and designating the U.S., the entire contents of which are incorporated herein by reference.

FIELD

The embodiments discussed herein are related to a system, a communications node, and a determining method.

BACKGROUND

Conventionally, in a sensor network system, numerous radio sensor nodes detect environmental changes in an area in which the sensor nodes are disposed.

According to a known technique, characteristics of sensor data for an area in which a sensor node is disposed are calculated based on data measured at respective sensor nodes and specific information that includes information indicating the respective positions of the sensor nodes, for example, refer to Japanese Laid-Open Patent Publication No. 2012-165249.

According to another known technique, the power consumption of sensor nodes is reduced by grouping nearby sensor nodes and sequentially operating the sensor nodes, for example, refer to International Publication No. 2006/090480.

According to yet another technique, even when communication is not being performed, measurement values obtained by a sensor are accumulated at a sensor node and based on the accumulated information, the measurement values are transmitted, for example, refer to Japanese Laid-Open Patent Publication No. 2005-223497. Further, according to another known technique, a sensor spontaneously performs measurement and a sensor managing apparatus stores to a storage unit, measurement values from the sensor and measurement time information, whereby a change in the measurement values is detected, for example, refer to Japanese Laid-Open Patent Publication Nos. 2003-115093 and 2005-100443. More specifically, for example, according to a known technique, a measurement value for a timing specified by a client is generated based on the measurement time information and the measurement values stored in the storage unit.

Nonetheless, a problem arises in that, for example, when the transmission of measurement values by a portion of the sensor nodes is suspended to suppress power consumption, the precision of abnormality detection decreases.

SUMMARY

According to an aspect of an embodiment, a system includes communications nodes, respectively having a sensor; and a communications apparatus that simultaneously requests the communications nodes to transmit sensor data. A first communications node among the communications nodes, when determining that among a first state where the communications apparatus includes the first communications node when requesting transmission and a second state where the communications apparatus excludes the first communications node when requesting transmission, the first communications node is in the second state: determines whether a predetermined difference is present between a predetermined value and the sensor data of the first communications node, and transmits a notification signal that notifies the communications apparatus of the predetermined difference, when determining that the predetermined difference is present.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram depicting an example of operation of a system according to the present invention;

FIGS. 2A and 2B are diagrams depicting examples of node density and measurement precision;

FIG. 13 is a diagram depicting an example of relayed transfer of an abnormality notification signal;

FIG. 14 is a diagram depicting an example of relayed transfer of a drop request signal;

FIGS. 15, 16, and 17 are flowcharts of an example of a process procedure performed by a sensor node according to the first example;

FIG. 18 is a flowchart of an example of a procedure of a transfer process of the transmission request signal depicted in FIG. 15;

FIG. 19 is a flowchart of an example of a process procedure performed by the management server according to the first example;

FIG. 20 is a diagram depicting an example of packet configuration of signals according to a second example;

FIG. 23 is a diagram depicting an example of relayed transfer of a suspension request signal;

FIG. 24 is an operation sequence diagram of the system according to the second example;

FIGS. 25, 26, and 27 are flowcharts of an example of a process procedure performed by the sensor node according to the second example;

FIG. 28 is a flowchart of an example of a procedure of the transfer process of a transmission request signal depicted in FIG. 25; and FIG. 29 is a flowchart of an example of a process procedure performed by the management server according to the second example.

DESCRIPTION OF EMBODIMENTS

Figure 3:
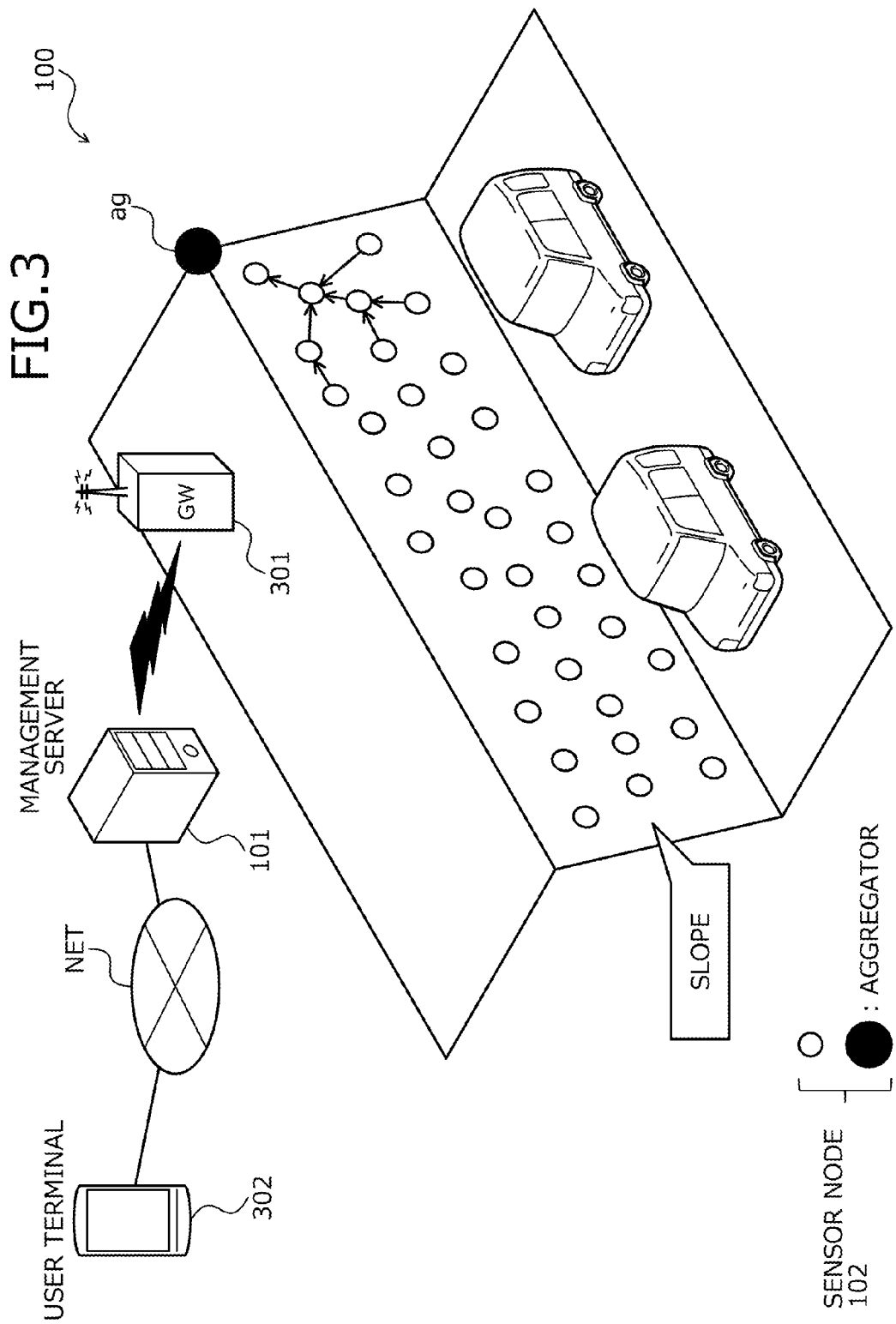
FIG. 3 is diagram depicting an example of utilization of the system.

Embodiments of a system, a communications node, and a determining method according to the present invention will be described in detail with reference to the accompanying drawings.

FIG. 1 is a diagram depicting an example of operation of a system according to the present invention. A system 100 is a sensor network system in which sensor nodes 102, which have a sensor and a small radio communications circuit, form a network and the sensor network system is configured to collect sensor data. The system 100 has sensor nodes 102 and a management server 101. The sensor nodes 102 are radio communications nodes that have a sensor. The management server 101 is a communications apparatus that manages the sensor nodes 102.

The management server 101 excludes a portion of the sensor nodes 102 and simultaneously requests the sensor nodes 102 to transmit sensor data. The portion of the sensor nodes 102 not requested to transmit data will be referred to as suspended nodes. The number of suspended nodes may be set in advance. Further, the management server 101 may randomly determine suspended nodes from among the sensor nodes 102, or may group the sensor nodes 102 and sequentially set grouped sensor nodes 102 as suspended nodes.

A sensor node 102 determines whether the sensor node 102 is included among sensor nodes 102 requested by the management server 101 to transmit sensor data (first state) or the sensor node 101 is excluded from among the sensor nodes 102 requested by the management server 102 (second state). Here, sensor data is referred to as a measurement value. For example, as described in a first example hereinafter, according to whether the sensor node 102 is included as an intended recipient of a data signal that transmits a measurement value, the sensor node 102 determines whether the sensor node 102 is in the first state or the second state. For example, if the sensor node 102 is included as an intended recipient of the data signal, the sensor node 102 is in the first state and if the sensor node 102 is not included as an intended recipient of the data signal, the sensor node 102 is in the second state. Further, for example, as described in a second example hereafter, based on whether the sensor node 102 is included as an intended recipient of a suspension request signal that requests a suspension of transmission operations and reception operations for a predetermined interval, the sensor node 102 determines whether the sensor node 102 is in the first state or the second state. For example, if the sensor node 102 is not included as an intended recipient of the suspension request signal, the sensor node 102 is in the first state and if the sensor node 102 is included as an intended recipient of the suspension request signal, the sensor node 102 is in the second state. Here, a sensor node 102 that is in the second state is a suspended node described above.

In the example depicted in FIG. 1, a sensor node 102-a, a sensor node 102-b, and a sensor node 102-c are in the second state. Subsequently, when a sensor node 102-i determines that the sensor node 102-i is in the second state, the sensor node 102-i determines whether there is a predetermined difference between a predetermined value and the measurement value of the sensor of the communications node of the sensor node 102-i. Here, the predetermined value is a measurement value received from a sensor node 102 among the sensor nodes 102 excluding the sensor node 102-i and a measurement value of a sensor of a sensor node 102 among the sensor nodes 102 and excluding the sensor node 102-i. The predetermined difference, for example, is the presence of a difference between a received measurement value and the measurement value of the sensor of the communications node of the sensor node 102-i, the difference thereof being greater than a predetermined value specified by a user, etc. The predetermined difference may be determined at the time of design of the system 100. Subsequently, if the sensor node 102-i determines that the difference is the predetermined difference, the sensor node 102-i wirelessly transmits a signal that notifies the management server 101 that the difference is the predetermined difference.

Further, for example, when a portion of the sensor nodes 102 are suspended, local transient abnormalities such as cracks and vibrations may go undetected. In this regard, in the present embodiment, a portion of the sensor nodes 102 are prohibited from transmitting data and a portion of the nodes detect abnormalities by comparing the measurement value thereof and a measurement value received from another communications node. As a result, decreases in the precision of abnormality detection resulting from measurement value comparisons by suspended nodes are suppressed and in the system 100, the volume of signals at the time of measurement value collection can be reduced, whereby the power consumption of the sensor nodes 102 can be decreased.

FIGS. 2A and 2B are diagrams depicting examples of node density and measurement precision. As depicted in FIG. 2A, when the density of sensor nodes 102 disposed in an arrangement area is low, the measurement precision of each measurement becomes low in the arrangement area. Further, as depicted in FIG. 2A, since the volume of data transferred between the sensor nodes 102 decreases, the communication time required for data transmission and reception decreases, and battery consumption is reduced. In contrast, as depicted in FIG. 2B, when the density of sensor nodes 102 in an arrangement area is high, the measurement precision of each measurement becomes high in the arrangement area. Further, as depicted in FIG. 2B, since the volume of data transferred between the sensor nodes 102 increases, the communication time required for data transmission and reception increases as does battery consumption.

Thus, as described with reference to FIG. 1, the number of the sensor nodes 102 that transmit sensor data are reduced and sensing by the sensors is performed, whereby the sensor data and the received sensor data of another sensor node 102 are compared. As a result, decreases in the measurement precision can be suppressed, the volume of data transferred between the sensor nodes 102 can be reduced, and power consumption can be reduced.

FIG. 3 is diagram depicting an example of utilization of the system according to the present invention. For example, in the system 100 depicted in FIG. 3, the sensor nodes 102 are disposed in an arrangement area such as on a slope, and monitor breakdown of the slope by sensors included in the sensor nodes 102. The arrangement area is not limited to slopes and, for example, the sensor nodes 102 may be disposed in an arrangement area filled with a substance such as concrete, soil, water, air, and the like in an agricultural field, building, and the like. Further, a sensor included in a sensor node 102, for example, may measure temperature, water content, vibration, etc. The management server 101, for example, wirelessly communicates with the sensor node 102 via a gateway 301 and an aggregator ag. The aggregator ag, for example, may be a sensor node 102 included among the sensor nodes 102. The gateway 301 transmits a signal from the management server 101 to the aggregator ag, and transmits a signal from the aggregator ag to the management server 101.

Figure 4:
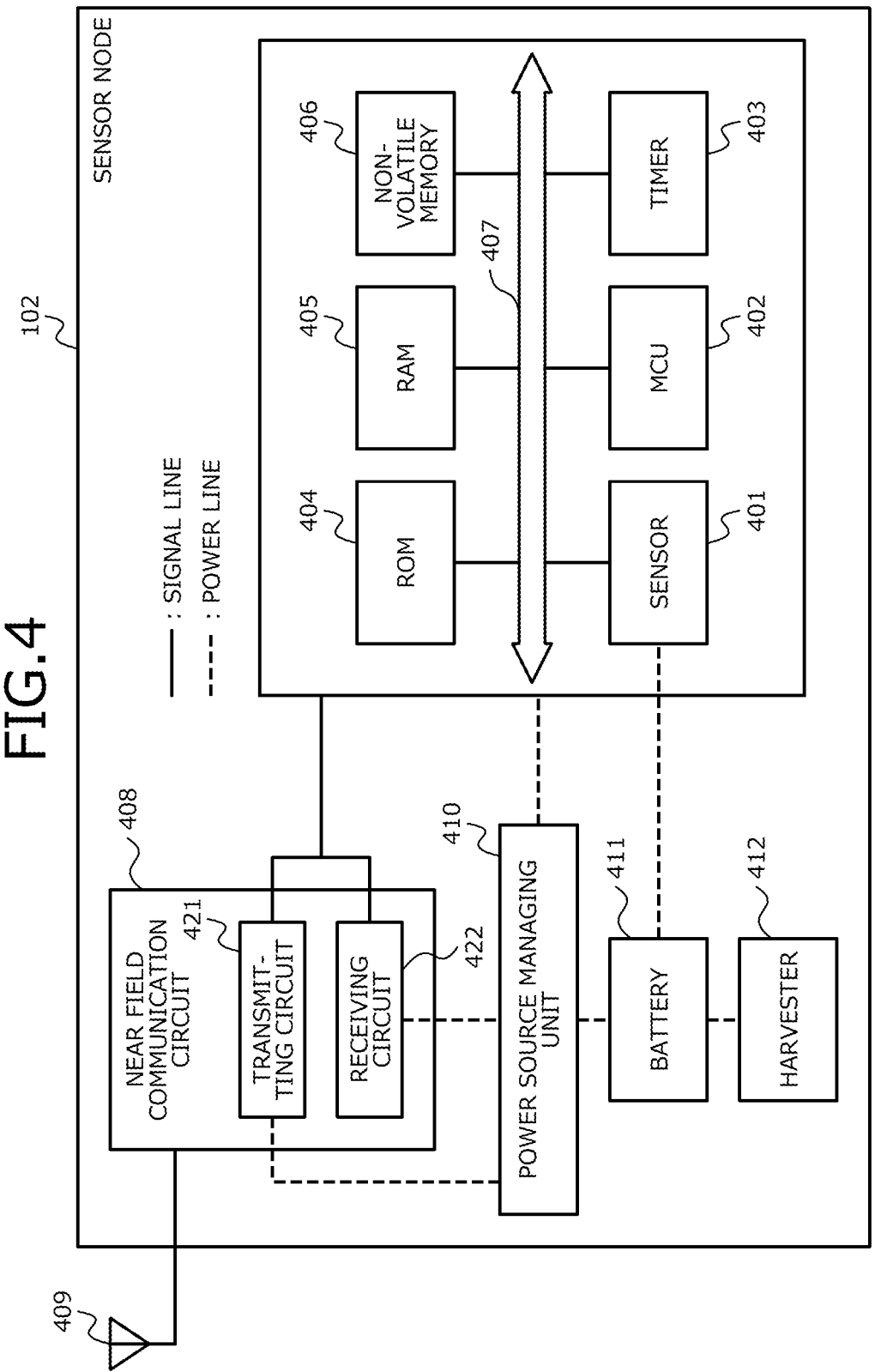
FIG. 4 is a block diagram depicting an example of hardware configuration of a sensor node.

FIG. 4 is a block diagram depicting an example of hardware configuration of a sensor node. The sensor node 102 has a sensor 401, a micro control unit (MCU) 402, a timer 403, read-only memory (ROM) 404, random access memory (RAM) 405, and non-volatile memory 406. Further, the sensor node 102 has a near field communication circuit 408, an antenna 409, a power source managing unit 410, a battery 411, and a harvester 412. The sensor node 102 further has an internal bus 407 connecting the sensor 401, the MCU 402, the timer 403, the ROM 404, the RAM 405, and the non-volatile memory 406. Further, in FIG. 4, dotted lines represent power lines and solid lines represent signal lines.

The sensor 401 detects predetermined changes occurring at an installation site. The sensor 401, for example, may be a piezoelectric device that detects voltage at the installation site, a device that detects temperature, a photoelectric device that detects light, and the like. The antenna 409 transmits and receives radio waves performing wireless communication with other sensor nodes 102 and the gateway 301. For example, the near field communication circuit 408 is a radio frequency (RF) circuit. The near field communication circuit 408 has a reception circuit 422 that outputs as a received signal, radio waves received via the antenna 409 and a transmission circuit 421 that transmits a transmission signal via the antenna 409 as radio waves. The transmission power of the transmission circuit 421 may be varied by the MCU 402. Further, in the present embodiment, for example, the transmission power of the transmission circuit 421 is configured such that a signal can travel a preset distance.

The MCU 402, for example, is a control unit that performs data management and overall control of the sensor node 102 by loading a program stored in the ROM 404 onto the RAM 405 and executing the program. For example, the MCU 402 manages data obtained by the sensor 401. The timer 403, for example, counts the time set by the MCU 402. In the present embodiment, for example, the timer 403 counts a sensing interval for the sensor 401 to spontaneously perform sensing. Further, for example, the timer 403 counts a predetermined interval for suspending the near field communication circuit in a second example described hereinafter.

The ROM 404 is a storage unit storing therein programs executed by the MCU 402. The RAM 405 is a storage unit storing therein transient data processed at the MCU 402. The non-volatile memory 406 is a storage unit configured by writable memory and retains predetermined data written thereto, even when power supply ceases. For example, the writable non-volatile memory 406 may be flash memory. In a storage unit such as the ROM 404, the RAM 405, and the non-volatile memory 406, for example, information concerning received signals, a nearby node list, a suspended node list, and the like described hereinafter are stored.

The harvester 412 generates electrical power based on energy changes such as those related to light, vibration, temperature, and radio waves, for example, in the external environment of the installation site of the sensor node 102. In the example depicted in FIG. 4, although a single harvester 412 is disposed, without limitation hereto, the harvester 412 of a similar type may be disposed in plural, or harvesters 412 of differing types may be disposed. The harvester 412 may generate electrical power according to a change detected by the sensor 401, or may generate electrical power according to a change in radio waves received from the near field communication circuit 408. The battery 411 stores electrical power generated by the harvester 412. In other words, the sensor node 102 internally generates electrical power necessary for operation, without a primary battery or external power source being disposed. The power source managing unit 410 controls the supply of the electrical power stored by the battery 411 to components of the sensor node 102 as a driving power source.

Figure 5:
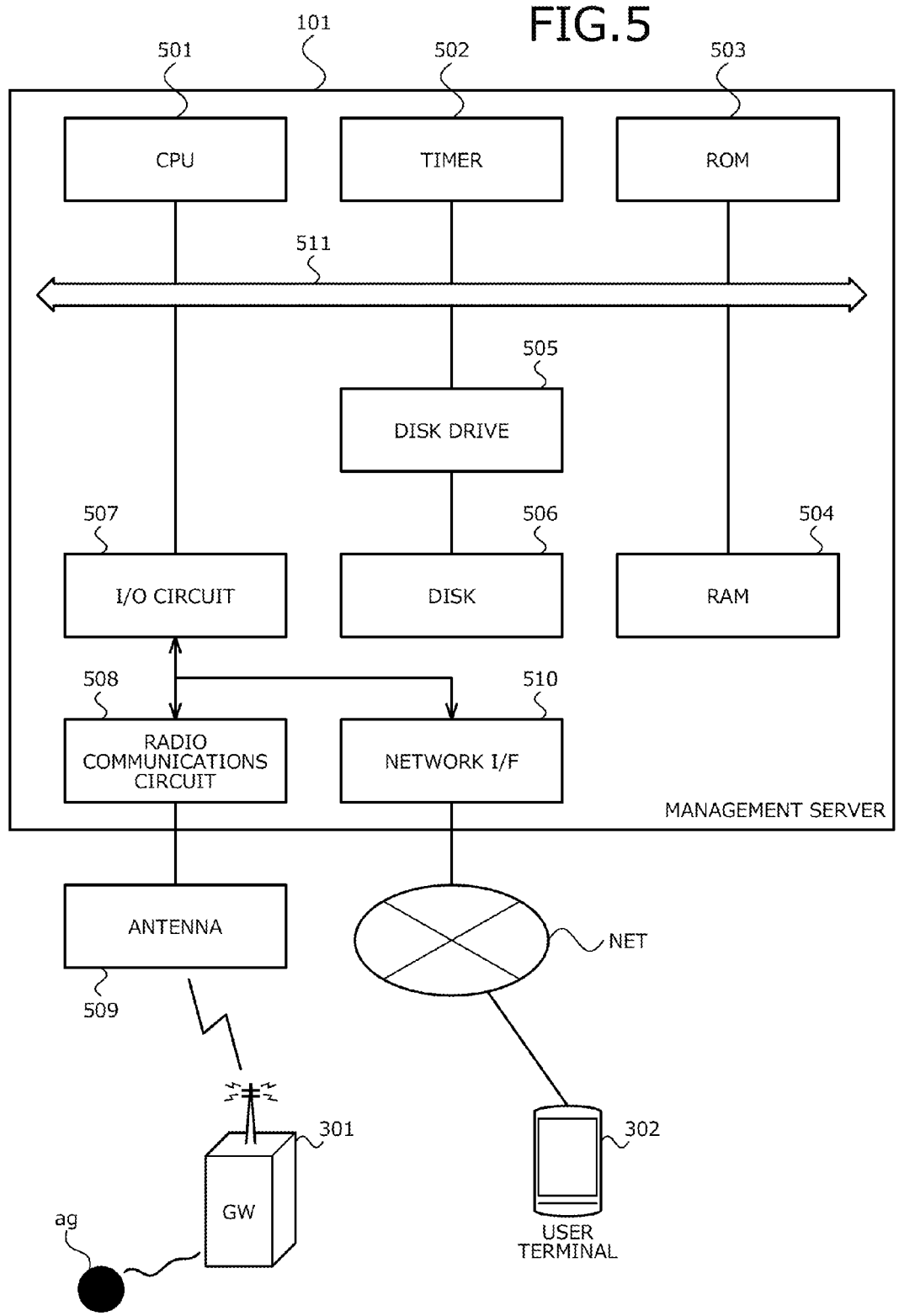
FIG. 5 is a block diagram depicting an example of hardware configuration of a management server.

FIG. 5 is a block diagram depicting an example of hardware configuration of the management server. The management server 101, unlike the sensor node 102, operates using an external power supply. The management server 101 has a central processing unit (CPU) 501, a timer 502, ROM 503, RAM 504, a disk drive 505, a disk 506, and an input/output (I/O) circuit 507. The management server 101 further has an internal bus 511 connecting the CPU 501, the timer 502, the ROM 503, the RAM 504, the disk drive 505, and the I/O circuit 507.

Here, the CPU 501 governs overall control of the management server 101. The ROM 503 is a storage unit storing therein programs such as a boot program. The RAM 504 is a storage unit that is used as a work area of the CPU 501. The disk drive 505, under the control of the CPU 501, controls the reading and writing of data with respect to the disk 506. The disk 506 is a storage unit storing therein data written thereto under the control of the disk drive 505. A magnetic disk, an optical disk, and the like may be used as the disk 506.

The I/O circuit 507 is connected to a radio communications circuit 508 and an antenna 509. Thus, the management server 101 is capable of wirelessly communicating with the sensor node 102 by wirelessly communicating with the gateway 301 via the radio communications circuit 508 and the antenna 509. Further, the I/O circuit 507 is connected to a network I/F 510. Thus, via the network I/F 510, the management server 101 is capable of communicating with external apparatuses such as a user terminal 320 through a network NET such as the Internet, by a protocol process such as Transmission Control Protocol (TCP)/Internet Protocol (IP). Wired communication and wireless communication are applicable in the communication via the network I/F 510.

Although not depicted, the management server 101 may include an input apparatus such as a keyboard, a mouse, a touch panel, and the like. As a result, the user can directly operate the management server 101 via the input apparatus. Further, for example, the management server 101 may include an output apparatus such as a display, a printer, a buzzer, and the like. As a result, for example, when an abnormality occurs, depending on the type of abnormality, the management server 101 can output an alarm to the output apparatus in addition to the user terminal 302.

Assumed conditions concerning the management server 101 and the sensor node 102 according to the present embodiment will be described simply. Further, for example, each sensor node 102 is assumed to store in a storage apparatus such as RAM, non-volatile memory, and the like of the sensor node 102, a nearby node list that indicates nearby sensor nodes 102. For example, the nearby node list is created by each sensor node 102 at the start of operation of the system 100. For example, each sensor node 102 transmits by a predetermined transmission power, a signal requesting a response and stores to the nearby node list as a nearby node, identification information of a node that transmits a response to the signal.

The management server 101 need not have information concerning the respective positions of the sensor nodes 102. As described above, for example, when the sensor nodes 102 are disposed on a slope, detection of an occurrence of an abnormality in the slope suffices and detection detailing a position where an abnormality occurred in the slope need not be performed.

The management server 101 collects measurement values of the sensor nodes 102 requesting transmission of the measurement values. Thus, for example, the management server 101 may perform calculations such as calculating averages, variance, and the like based on the collected measurement values and thereby, detect abnormalities of the sensor nodes 102 and at the installation sites of the sensor nodes 102. Further, for example, the management server 101 may detect abnormalities according to differences between an average or variance calculated based on current measurement values and the average or variance calculated based on previous measurement values.

Detailed operation examples of the sensor node 102 and the management server 101 according to the present embodiment will be described separately for the first example and the second example. The first example is a case where a sensor node 102 is not included as an intended recipient of a data signal to notify the management server 101 of measurement values measured by other sensor nodes 102 and the sensor node 102 detects an abnormality by comparing a measurement value included in the data signal and a measurement value of the sensor node 102. In the second example, the sensor node 102 is included as an intended recipient of a suspension request signal, suspends transmission and reception operations for a predetermined interval and detects an abnormality by comparing a measurement value measured by another sensor node 102 and a measurement value of the sensor node 102.

In the first example, the sensor node 102 when determining that the sensor node 102 is not included as an intended recipient of a data signal, detects an abnormality by comparing the measurement value of the sensor node 102 and a measurement value that is measured by and received from another sensor node 102. As a result, the precision of abnormality detection is improved and reduced power consumption can be facilitated.

Figure 6:
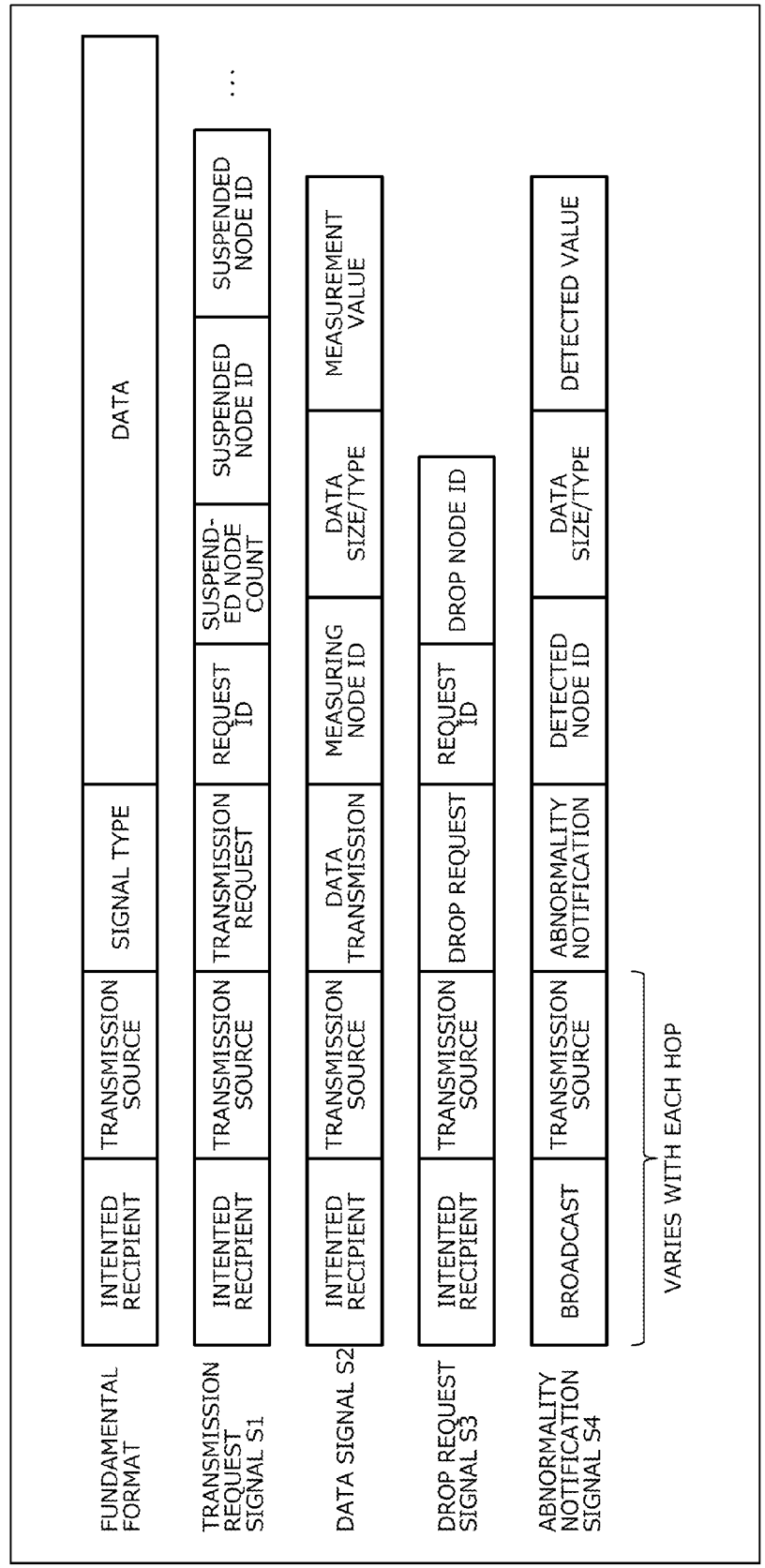
FIG. 6 is a diagram depicting an example of packet configuration of signals according to a first example.

FIG. 6 is a diagram depicting an example of packet configuration of signals according to the first example. In the first example, signals transmitted or received by a sensor node 102 include transmission request signals S1, data signals S2, drop request signals S3, and abnormality notification signals S4. As a fundamental format, a packet has identification information indicating an intended recipient, identification information indicating a transmission source, signal type, and data. The intended recipient is the identification information of a sensor node 102 that is to perform processing corresponding to the signal. The transmission source is identification information indicating the transmission source of the signal. The signal type is identification information indicating the type of the signal. The data is data related to processing corresponding to the signal.

For example, a transmission request signal S1 is a signal by which the management server 101 requests transmission of the measurement values by the sensors 401. The transmission request signal S1 has identification information indicating an intended recipient, identification information indicating the transmission source, information indicating a transmission request, a request ID, a suspended node count, and suspended node IDs. For example, each sensor node 102 compares the request ID included in a transmission request signal S1 received in the past and the request ID included in a newly received transmission request signal S1. As a result, repeated transfer of the same transmission request signal S1 by a single sensor node 102 can be prevented.

For example, a data signal S2 is a signal by which a sensor node 102 transmits the measurement value of the sensor 401 to a communications apparatus. For example, the data signal S2 has identification information indicating an intended recipient, identification information indicating the transmission source, information indicating data transmission, a measuring node ID, data size/type, and a measurement value. For example, the measuring node ID is identification information of the sensor node 102 that obtained the measurement value. For example, the data size of the measurement value, the type of the measurement value, and the like may be set as the data size/type. As described above, since various types of the sensor 401 may be disposed, information indicating that the measurement value included in the data signal S2 is a temperature, a humidity level, etc. is set as the type of the measurement value.

For example, a drop request signal S3 is a signal for excluding the sensor 401 of a sensor node 102 from measurement, when the sensor node 102 itself has been determined to have an abnormality, for example. For instance, the drop request signal S3 has identification information indicating an intended recipient, identification information indicating the transmission source, information indicating a drop request, a request ID, and a drop node ID. For example, each sensor node 102 compares the request ID included in a drop request signal S3 received in the past and the request ID included in a newly received drop request signal S3. As a result, repeated transfer of the same drop request signal S3 by a single sensor node 102 can be prevented.

For example, an abnormality notification signal S4 is a signal that notifies the management server 101 that there is a predetermined difference between the measurement value of a suspended node 102 and the measurement value of another sensor node 102. For example, the abnormality notification signal S4 has information indicating broadcast as an intended recipient, identification information indicating the transmission source, information indicating abnormality notification, detected node ID, the data size/type, and a detected value. The detected node ID is identification information indicating the sensor node 102 at which the abnormality occurred. The data size/type is the size of the detected value, or the type of the measurement value of the sensor node 102 for which an abnormality is determined. A detected value, for example, may be a measurement value of the sensor node 102 itself for which an abnormality is determined or may be a difference of two sensor nodes 102 between which an abnormality has been determined.

Figure 7:
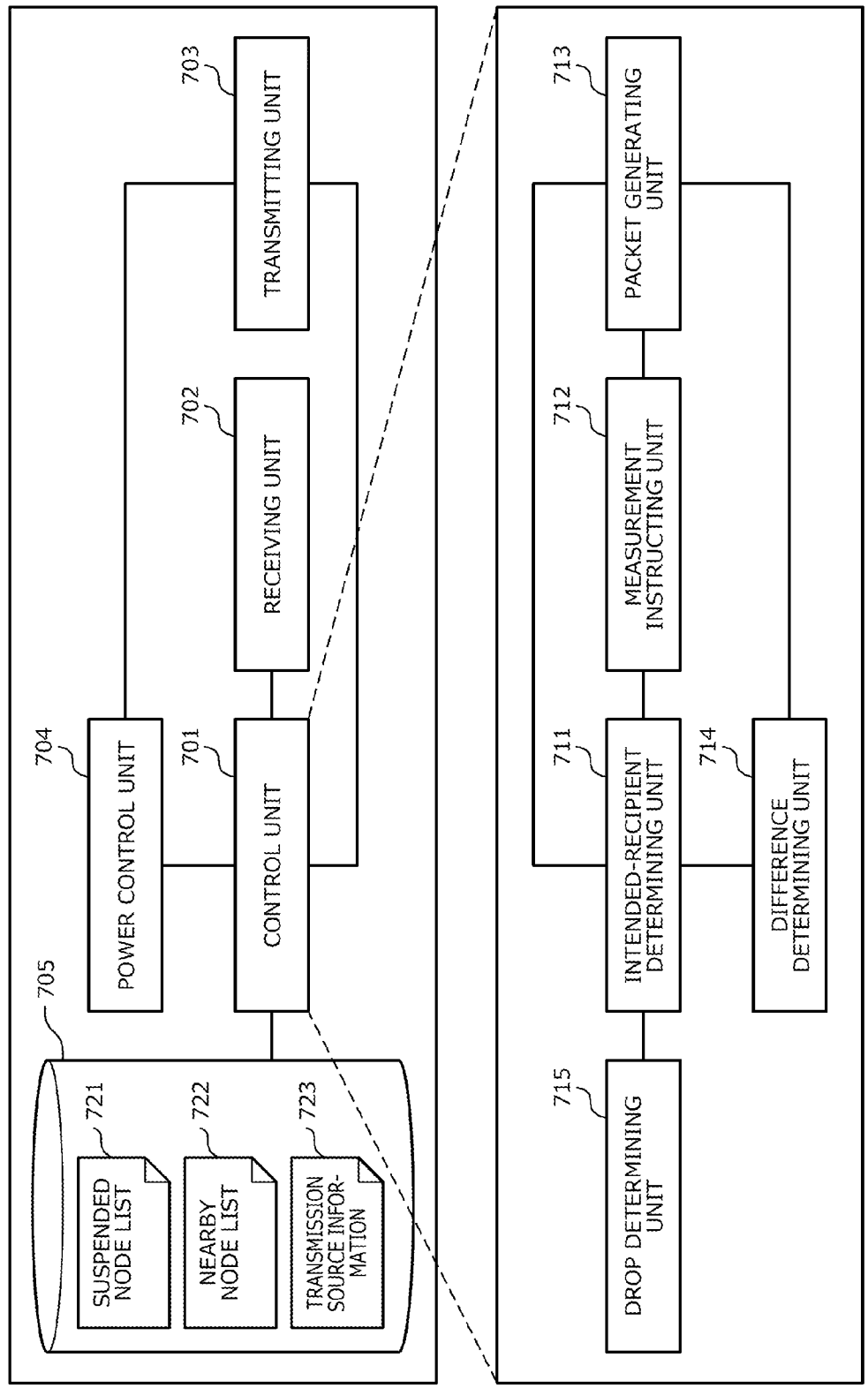
FIG. 7 is a block diagram depicting an example of a functional configuration of a sensor node.

FIG. 7 is a block diagram depicting an example of a functional configuration of a sensor node. A sensor node 102, for example, has a control unit 701, a receiving unit 702, and a transmitting unit 703. The transmitting unit 703, for example, is the transmission circuit 421 described above. The receiving unit 702, for example, is the reception circuit 422 described above. A power control unit 704 is implemented by the power source managing unit 410. The control unit 701, for example, is implemented by the MCU 402. Further, processes of the control unit 701, for example, are coded in a program stored in a storage unit 705 accessible by the MCU 402. The MCU 402 reads a program from the storage unit 705 and executes a process encoded in the program, whereby processes of the control unit 701 are implemented. Further, process results of the control unit 701, for example, are stored to the storage unit 705 such as the RAM 405, the non-volatile memory 406, and the like.

Figure 8:
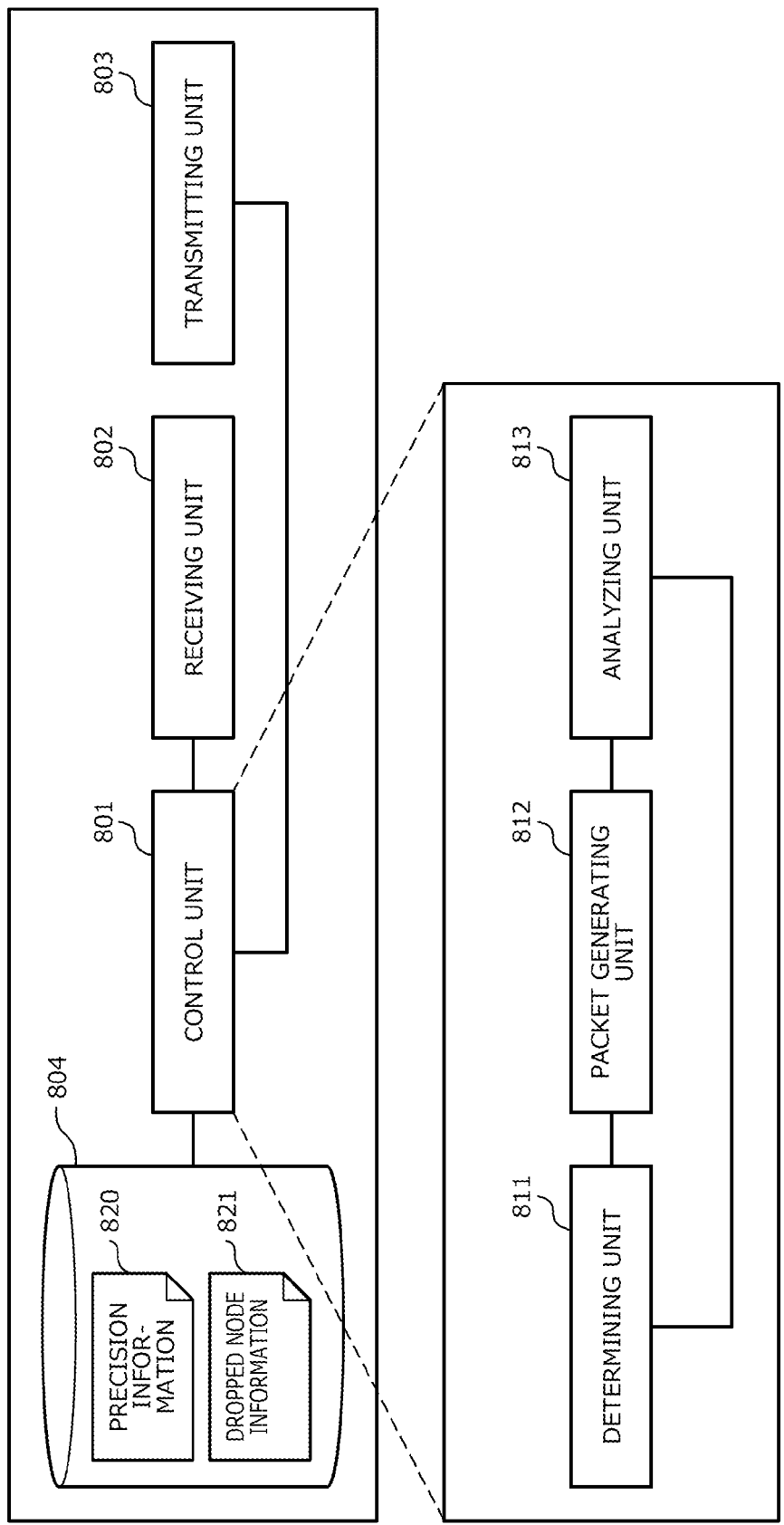
FIG. 8 is a block diagram depicting an example of a functional configuration of the management server.

FIG. 8 is a block diagram depicting an example of a functional configuration of the management server. The management server 101 has a control unit 801, a receiving unit 802, and a transmitting unit 803. The receiving unit 802 and the transmitting unit 803 are the radio communications circuit 508 described above. The control unit 801, for example, is the CPU 501. Further, processes of the control unit 801, for example, are encoded in a program stored in a storage unit 804 accessible by the CPU 501. The CPU 501 reads the program from the storage unit 804 and executes a process encoded in the program, whereby processes of the control unit 801 are implemented. Further, process results of the control unit 801, for example, are stored to the storage unit 804 such as the RAM 504, the disk 506, and the like.

The control unit 801 determines suspended nodes and causes the transmitting unit 803 to transmit a transmission request signal S1 to sensor nodes 102 excluding the determined suspended nodes. Further, the control unit 801 collects measurement values that correspond to the transmission request signal S1 and that are received from the sensor nodes 102 by the receiving unit 802. The control unit 801 analyzes the collected measurement values and thereby, determines whether an abnormality has occurred. Further, the control unit 801, when determining that an abnormality has occurred, performs a process according to the type of the abnormality. More specifically, the control unit 801 has a determining unit 811, a packet generating unit 812, and an analyzing unit 813.

For example, the determining unit 811, when detecting by the timer 502, a timer event occurring at a predetermined interval, obtains precision information 820 indicating the required precision. For example, the required precision may be operation efficiency. The precision information 820, for example, may be pre-stored in a storage apparatus such as the ROM 503, the disk 506, and the like, or may be obtained from the user via the user terminal 302. The determining unit 811 calculates a suspended node count based on the required precision indicated by the precision information 820. The determining unit 811 determines from among the sensor nodes 102, sensor nodes 102 of the calculated suspended node count to be suspended nodes. The determination method here is not particularly limited and may be random.

Figure 9:
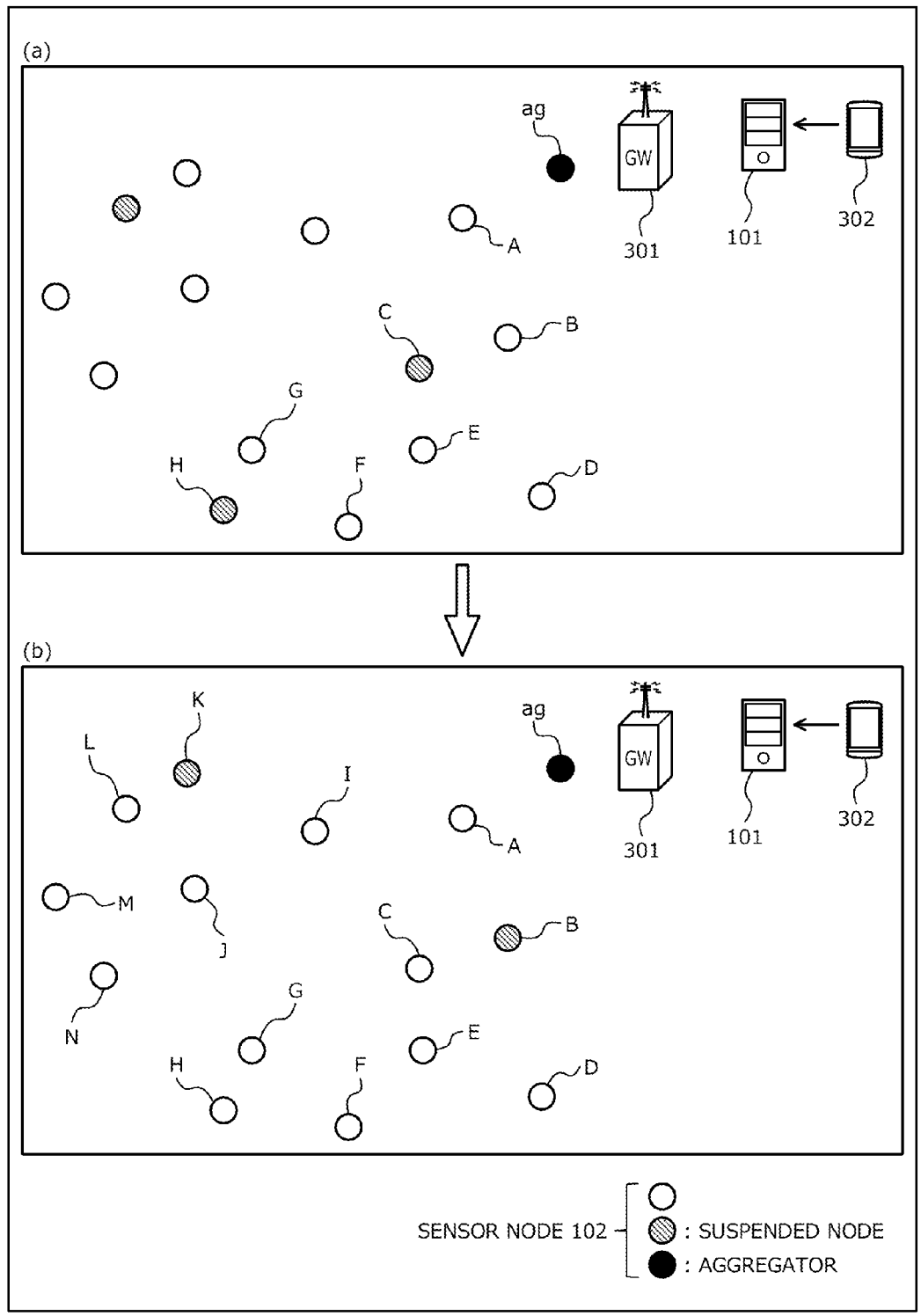
FIG. 9 is a diagram depicting an example of suspended node determination.

FIG. 9 is a diagram depicting an example of suspended node determination. The suspended node count differs according to the required precision. For example, in (a) of FIG. 9, the suspended node count is 3 whereas in (b) of FIG. 9, the suspended node count is 2. Further, for example, as depicted in FIG. 9, the determining unit 811 may determine from among the sensor nodes 102 that exclude the sensor nodes 102 that are suspended nodes in (a), the suspended nodes in (b).

The packet generating unit 812 newly generates a request ID. The packet generating unit 812 generates and outputs to the transmitting unit 803, a transmission request signal S1 that includes identification information indicating the aggregator ag as an intended recipient, identification information indicating the management server 101 as the transmission source, the generated request ID, the suspended node count, and identification information identifying suspended nodes. The transmitting unit 803 transmits the generated transmission request signal S1.

The power control unit 704 regularly supplies electrical power of the battery 411 to the receiving unit 702 and supplies electrical power of the battery 411 to the transmitting unit 703 only when transmission operation is performed by the transmitting unit 703. As a result, the amount of electrical power of the sensor node 102 can be reduced.

The control unit 701 controls whether transmission operation by the transmitting unit 703 is to be suspended, based on whether the sensor node 102 thereof is in the first state of being included among sensor nodes 102 requested to transmit by the management server 101 or the second state of being excluded from among the sensor nodes 102 requested to transmit. More specifically, the control unit 701 has an intended-recipient determining unit 711, a measurement instructing unit 712, a packet generating unit 713, a difference determining unit 714, and a drop determining unit 715.

The intended-recipient determining unit 711 determines whether the sensor node 102 thereof is in the first state of being included among the sensor nodes 102 requested to transmit by the management server 101 or the second state of being excluded from among the sensor nodes 102 requested to transmit.

More specifically, the receiving unit 702 receives a transmission request signal S1 requesting transmission. The intended-recipient determining unit 711 determines whether the communications node thereof is included as an intended recipient of the transmission request signal S1 received by the receiving unit 702 and thereby, determines whether the communications node thereof is in the first state or the second state.

Figure 10:
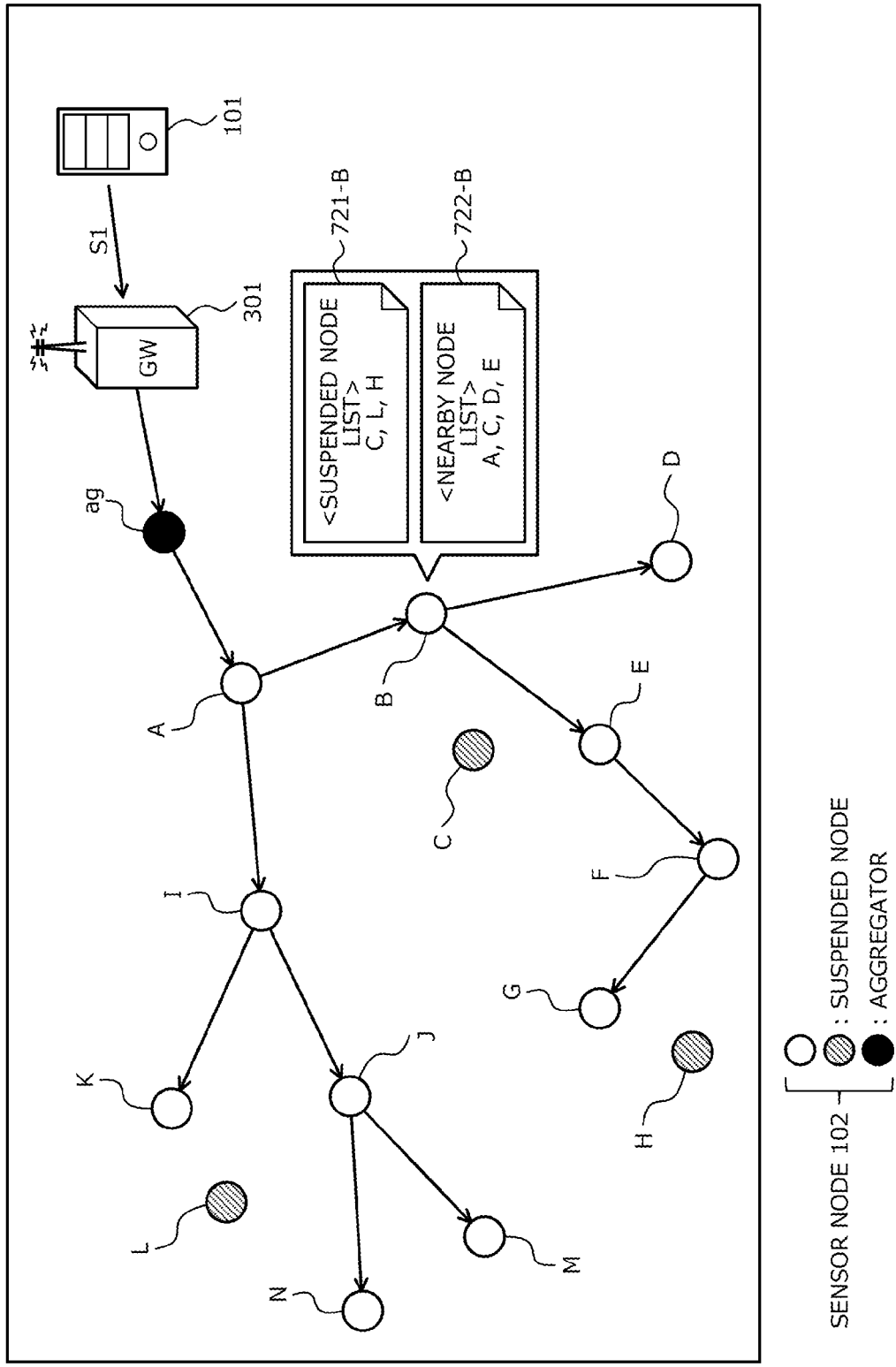
FIG. 10 is a diagram depicting an example of relayed transfer of a transmission request signal.

FIG. 10 is a diagram depicting an example of relayed transfer of a transmission request signal. Solid arrows indicate intended recipients of transmission request signals S1. Suspended nodes are not included as an intended recipient of a transmission request signal S1. In this example, a sensor node 102-B is described as an example. The intended-recipient determining unit 711-B determines whether the sensor node 102-B is included as an intended recipient of a transmission request signal S1 received by the receiving unit 702-B from a sensor node 102-A. In the example depicted in FIG. 10, the sensor node 102-B is assumed to be included and the intended-recipient determining unit 711-B newly generates a suspended node list 721 from the identification information included in the transmission request signal S1 and indicating suspended nodes. The suspended node list 721-B has identification information respectively indicating a sensor node 102-C, a sensor node 102-L, and a sensor node 102-H. The generated suspended node list 721, for example, is stored to the storage unit 705 such as the RAM 405 and the non-volatile memory 406. Here, the previous suspended node list 721 is deleted.

The intended-recipient determining unit 711-B generates transmission source information 723 from the transmission source of the transmission request signal S1. The transmission source information 723 includes identification information indicating the transmission source of the transmission request signal S1. The generated transmission source information 723, for example, is stored to the storage unit 705 such as the RAM 405 and the non-volatile memory 406. Here, the previous transmission source information 723 is deleted.

The packet generating unit 713-B changes the intended recipients of the transmission request signal S1, from the sensor nodes 102 indicated by identification information included in a nearby node list 722, to sensor nodes 102 that exclude the sensor nodes 102 indicated by the identification information included in the suspended node list 721. Here, the transmission source of the received transmission request signal S1 may also be excluded. Since the transmission source of the received transmission request signal S1 is the sensor node 102-A and identification information indicating the sensor node 102-C is included in the suspended node list 721-B, the intended recipients of the transmission request signal S1 are changed to the sensor node 102-D and the sensor node 102-E. The packet generating unit 713-B generates a transmission request signal S1 that is the received transmission request signal S1 in which the transmission source is changed to the sensor node 102-B. The transmitting unit 703-B wirelessly transmits the generated transmission request signal S1.

Figure 11:
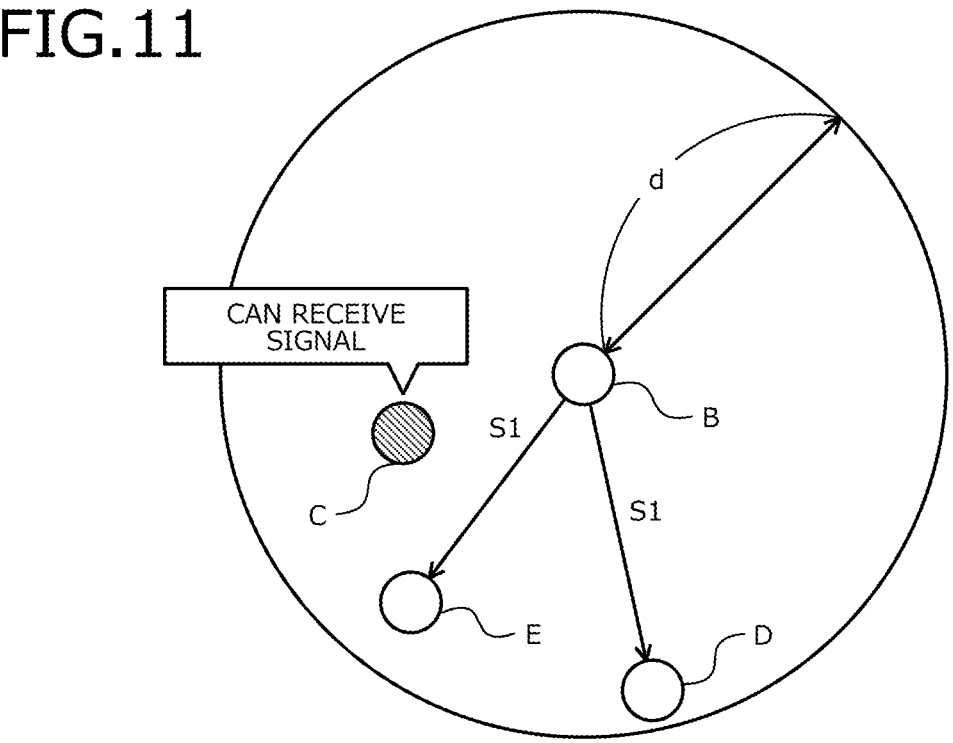
FIG. 11 is a diagram depicting an example of signal arrival.

FIG. 11 is a diagram depicting an example of signal arrival. For example, a distance that can be reached by signals transmitted by the transmitting unit 703-B is assumed to be d. Thus, as depicted in FIG. 11, a wirelessly transmitted transmission request signal S1 can be received by not only the sensor node 102-E and the sensor node 102-D, which are intended recipients of the transmission request signal S1, but also by the sensor node 102-C.

Thus, in the example depicted in FIG. 10, the receiving unit 702-C receives the transmission request signal S1 transmitted from the transmitting unit 703-B. The intended-recipient determining unit 711-C determines whether the sensor node 102-C is included as an intended recipient of the transmission request signal S1. In the example depicted in FIG. 10, the intended-recipient determining unit 711-C determines that the sensor node 102-C is not included as an intended recipient of the transmission request signal S1.

The sensor nodes 102 other than the sensor node 102-C and the sensor node 102-B also perform the same process.

The measurement instructing unit 712, if the first state has been determined, instructs the sensor 401 of the sensor node 102 of the measurement instructing unit 712 to measure. A case where the first state is determined is a case where a sensor node 102 determines that the sensor node 102 is included as an intended recipient of a transmission request signal S1. The packet generating unit 713 generates a data signal S2 that includes a measurement value obtained by the sensor 401. Intended recipients of the generated data signal S2 are sensor nodes 102 that among the sensor nodes 102, can directly communicate with the sensor node 102 that generated the data signal S2 and exclude the suspended nodes indicated by the suspended node IDs included in the transmission request signal S1. The measuring node ID of the data signal S2 is the identification information of the sensor node 102 that generated the data signal S2.

Further, an intended recipient of the data signal S2 may be the sensor node 102 indicated by the identification information included in the transmission source information 723. Thus, by retransmitting the data signal S2 to the transmission source of the transmission request signal S1, the data signal S2 can be transmitted to a sensor node 102 that is presumably closer to the management server 101. The transmitting unit 703 wirelessly transmits the generated data signal S2.

Figure 12:
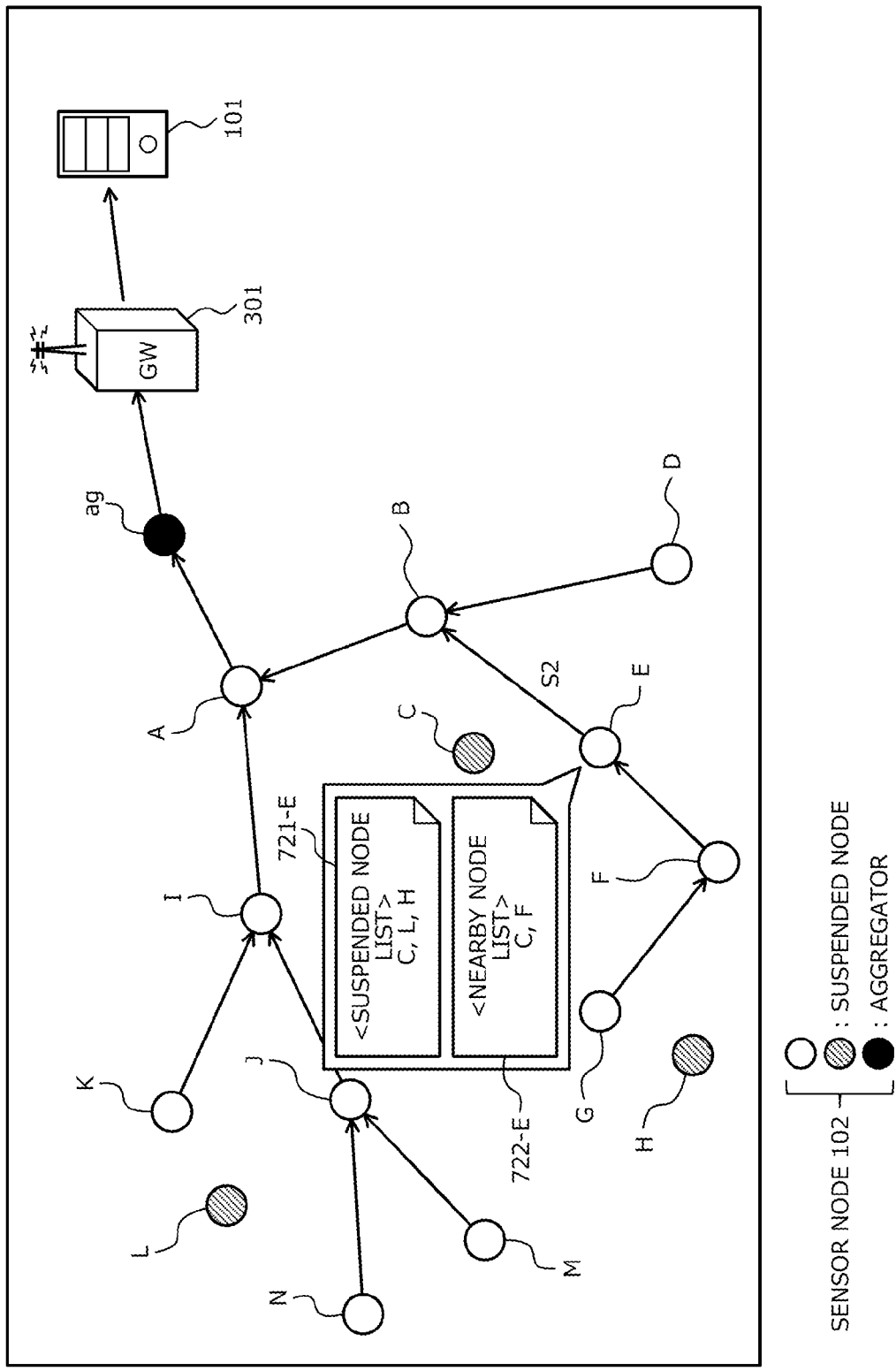
FIG. 12 is a diagram depicting an example of relayed transfer of a data signal.

FIG. 12 is a diagram depicting an example of relayed transfer of a data signal. As depicted in FIG. 12, description will be given taking the sensor node 102-E as an example. In a case where the first state is determined, the packet generating unit 713-E sets, as an intended recipient, the sensor node 102-B indicated by the identification information included in the transmission source information 723, and generates in response to an instruction by the measurement instructing unit 712-E, a data signal S2 that includes a measurement value obtained by the sensor 401. Identification information indicating the sensor node 102-E is set as the measuring node ID of the generated data signal S2. The transmitting unit 703-E wirelessly transmits the generated data signal S2.

When the receiving unit 702-B receives the data signal S2, the intended-recipient determining unit 711-B determines whether the sensor node 102-B is included as an intended recipient of the received data signal S2. The sensor node 102-B transmits a data signal S2 that is the received data signal S2 in which the intended recipient is set to the sensor node 102-A indicated by the transmission source information 723 of the receive data signal S2 and the transmission source is the sensor node 102-B. The sensor nodes 102 that are in the first state perform processes similar to those performed by the sensor node 102-E and the sensor node 102-A. In this manner, data signals S2 are transferred to the management server 101.

FIG. 13 is a diagram depicting an example of relayed transfer of an abnormality notification signal. For example, since the sensor node 102-L, which is a suspended node, is at a position that a signal transmitted by the transmitting unit 703-K reaches, the receiving unit 702-L can receive a data signal S2 transmitted by the transmitting unit 703-K. For example, the intended-recipient determining unit 711-L determines whether the sensor node 102-L is included as an intend recipient of the transmitted data signal S2.

In this example, since the sensor node 102-L is not included as an intend recipient, the difference determining unit 714-L determines whether the measuring node ID of the received data signal S2 is included in the nearby node list 722. If the measuring node ID is included in the nearby node list 722, the difference determining unit 714-L determines whether there is a predetermined difference between the measurement value obtained by the sensor 401 of the sensor node 102-L and the measurement value included in the received data signal S2. The predetermined difference, for example, may be the arithmetic difference being greater than 0, the arithmetic difference being greater than a predetermined value, and the like. Conditions concerning the predetermined difference may be pre-stored in the storage unit 705 such as the non-volatile memory 406 and the ROM 404.

The packet generating unit 713-L, when the difference determining unit 714-L determines that there is a predetermined difference, sets the intended recipient as a broadcast and generates an abnormality notification signal S4 that notifies the management server 101 of the predetermined difference at the sensor node 102-L. Further, intended recipients of the abnormality notification signal S4 may be the sensor nodes 102 indicated by the identification information included in the nearby node list 722. The transmitting unit 703-L wirelessly transmits the abnormality notification signal S4 generated by the packet generating unit 713-L.

Although not depicted, when the measuring node ID is not included in the nearby node list 722, the difference determining unit 714-L does not perform difference determination. For example, if the sensor node 102 indicated by the measuring node ID is the sensor node 102-M, since the identification information thereof is not included in the nearby node list 722, the difference determining unit 714-L does not determine the difference of the measurement value obtained by the sensor 401-L and the measurement value included in the received data signal S2. As a result, measurement values of closer sensor nodes 102 can be compared, enabling the precision of abnormality detection to be improved.

The measurement instructing unit 712, at predetermined periods measured by the timer 403, performs sensing by the sensor 401 and stores the measurement value to the storage unit 705 such as the non-volatile memory 406 and the RAM 405.

The control unit 701, when determining the second state, determines whether there is a predetermined difference between the measurement value of the sensor 401 of the communications node of the control unit 701 and a measurement value received from among the sensor nodes 102, a sensor node 102 excluding the sensor node 102 of the control unit 701. The received measurement value is the measurement value of the sensor 401 of a sensor node 102 among the sensor nodes 102, excluding the sensor node 102 of the control unit 701. The transmitting unit 703, in the case of a predetermined difference, wirelessly transmits an abnormality notification signal S4 notifying the management server 101 of the predetermined difference.

The receiving unit 802 receives data signals S2 that correspond to a transmission request signal S1 and thereby collects the measurement values of the sensor nodes 102. The analyzing unit 813 determines whether an abnormality is present based on the collected measurement values. The analyzing unit 813 may detect an abnormality at the installation site of a sensor node 102, an abnormality of a sensor node 102, and the like by performing calculations such as averages, variance, and the like based on the collected measurement values. Further, for example, the analyzing unit 813 may detect an abnormality according a difference between an average or variance calculated based on current collected measurement values and the average or variance calculated based on previous collected measurement values.

Further, for example, the receiving unit 802 receives an abnormality notification signal S4. The analyzing unit 813 determines the type of abnormality based on a detected value included in the abnormality notification signal S4 and analysis results of the collected measurement values. When the analyzing unit 813 detects an abnormality at an installation site, the control unit 801 sends an alarm to the user terminal 302. Taking FIG. 3 as an example, detection of an abnormality at an installation site is detection of a sign of collapse the slope.

When the analyzing unit 813 determines that an abnormality is consequent to detection precision, the determining unit 811 changes the detection precision based on the precision information 820 and thereafter, determines the suspended node count. The transmission of a transmission request signal S1 for measurement values is again performed by the determining unit 811, the packet generating unit 812, the transmitting unit 803, etc.

If it is determined that a sensor node 102 that has given notification of an abnormality has failed, the packet generating unit 812 generates a drop request signal S3 to drop the sensor node 102 from the system 100. Dropping from the system 100 is prohibiting sensing and data transfer by the sensor node 102. The transmitting unit 803 transmits the generated drop request signal S3. Further, the identification information of the sensor node 102 that is to be dropped is stored to the storage unit 804 such as the RAM 504 and the disk drive 505, as dropped node information 821.

FIG. 14 is a diagram depicting an example of relayed transfer of a drop request signal. The receiving unit 702-K receives a drop request signal S3 from a sensor node 102-I. The drop determining unit 715-K determines whether the drop node ID of the drop request signal S3 indicates the sensor node 102-K. In this example, the drop determining unit 715-K determines that the sensor node 102-K is not indicated by the drop node ID. The packet generating unit 713-K generates a drop request signal S3 that is the received drop request signal S3 in which the intended recipients are changed to the sensor nodes 102 indicated by the identification information included in the nearby node list 722. The transmitting unit 703-K wirelessly transmits the generated drop request signal S3.

The receiving unit 702-L receives the drop request signal S3 from the sensor node 102-K. The drop determining unit 715-L determines whether the drop node ID of the drop request signal S3 indicates the sensor node 102-L. If the sensor node 102-L is indicated, the power control unit 704-L suspends the power supply to the timer 403.

Further, the management server 101, based on the dropped node information 821, determines a dropped sensor node 102 to be a suspended node from thereafter. As a result, data transfer is not performed and since power supply of the timer 403 is blocked, new sensing by the sensor node 102-L is not performed and difference determination by the difference determining unit 714 is not performed. In this manner, the dropping of a sensor node 102 from the system 100 is enabled.

FIGS. 15, 16, and 17 are flowcharts of an example of a process procedure performed by a sensor node according to the first example. The sensor node 102, when activated, performs initialization (step S1501). More specifically, initialization represents supplying power to the reception circuit 422 and setting the timer 403. The sensor node 102 stands by until a reception or timer event occurs (step S1502).

When a reception event occurs, the sensor node 102 determines whether the sensor node 102 is included as an intended recipient of the received signal (step S1503). If the sensor node 102 is included as an intended recipient (step S1503: YES), the sensor node 102 determines whether the type of the received signal is a transmission request (step S1504). If the signal is a transmission request (step S1504: YES), the sensor node 102 determines based on the request ID, whether the same transmission request has already been received (step S1505).

If the same transmission request has already be received (step S1505: YES), the sensor node 102 returns to step S1502. If the same transmission request has not already be received (step S1505: NO), the sensor node 102 associates and stores the request ID with the transmission source node ID as the transmission source information 723 and the suspended node IDs as the suspended node list 721 (step S1506). The sensor node 102 performs a transfer process of the transmission request signal S1 (step S1507). The sensor node 102 performs measurement by the sensor 401 (step S1508). The sensor node 102 transmits a data signal S2 that includes the measurement value and has the transmission source of the received transmission request signal S1 set as an intended recipient (step S1509), and returns step S1502. Although not depicted, the sensor node 102 starts power supply to the transmission circuit 421 before transmitting the data signal S2 and suspends the power supply to the transmission circuit 421 after completing transmission of the data signal S2.

Further, at step S1504, if the signal is not a transmission request (step S1504: NO), the sensor node 102 determines whether the received signal is a drop request (step S1601). If the signal is not a drop request (step S1601: NO), the sensor node 102 sets, as an intended recipient, the transmission source indicated by the transmission source information 723 stored in the storage unit 705 and transmits the received signal (step S1602); and returns to step S1502. At step S1601, in the case of "NO", for example, the received signal is for data transmission or abnormality notification.

If the signal is a drop request (step S1601: YES), the sensor node 102 determines whether the sensor node 102 is to be dropped (step S1603). If the sensor node 102 is to be dropped (step S1603: YES), the sensor node 102 suspends the timer 403 (step S1604). Further, consequent to step S1604, the timer 403 is suspended whereby, the sensor node 102 is suspended, ending a series of operations.

If the sensor node 102 is not to be dropped (step S1603: NO), the sensor node 102 determines whether the same request has already been received (step S1605). If the same request has already been received (step S1605: YES), the sensor node 102 returns to step S1502. If the same request has not already been received (step S1605: NO), the sensor node 102 transmits the drop request signal S3 to nearby sensor nodes 102 (step S1606), and returns to step S1502.

At step S1502, if a timer event occurs, the sensor node 102 performs measurement by the sensor 401 (step S1701). The sensor node 102 compares the measurement value and a threshold or the measurement value stored at the previous measurement (step S1702). The sensor node 102 determines whether an abnormality has been detected (step S1703). If an abnormality has been detected (step S1703: YES), the sensor node 102 transitions to step S1709. If no abnormality has been detected (step S1703: NO), the sensor node 102 stores the measurement value (step S1704), and returns to step S1502.

At step S1503, if the sensor node 102 is not included as an intended recipient (step S1503: NO), the sensor node 102 determines whether the type of the received signal is a data signal (step S1705). If the received signal is not a data signal (step S1705: NO), the sensor node 102 returns to step S1502.

If the received signal is a data signal (step S1705: YES), the sensor node 102 determines whether the transmission source and the measuring node coincide (step S1706). If the transmission source and the measuring node do not coincide (step S1706: NO), the sensor node 102 transitions to step S1709.

If the transmission source and the measuring node coincide (step S1706: YES), the sensor node 102 compares the stored measurement value and the received measurement value (step S1707). For example, the sensor node 102 determines whether there is a predetermined difference between the measured measurement value and the received measurement value. The sensor node 102 determines whether an abnormality has been detected (step S1708). For example, the sensor node 102, when determining that there is a predetermined difference, determines that an abnormality has been detected; and the sensor node 102, when determining that there is no predetermined difference, determines that no abnormality has been detected. If an abnormality has been detected (step S1708: YES), the sensor node 102 transmits an abnormality notification signal S4 (step S1709), and returns to step S1502. If no abnormality has been detected (step S1708: NO), the sensor node 102 returns to step S1502.

FIG. 18 is a flowchart of an example of a procedure of the transfer process of the transmission request signal depicted in FIG. 15. The sensor node 102 obtains the nearby node list 722 (step S1801). The sensor node 102 selects identification information of a node from the nearby node list 722 (step S1802). The sensor node 102 determines whether the selected identification information is included in the suspended node list 721 (step S1803). If the selected identification information is included in the suspended node list 721 (step S1803: YES), the sensor node 102 transitions to step S1806.

If the selected identification information is not included in the suspended node list 721 (step S1803: NO), the sensor node 102 determines whether the selected identification information coincides with the transmission source information 723 (step S1804). If the selected identification information coincides with the transmission source information 723 (step S1804: YES), the sensor node 102 returns to step S1802.

If the selected identification information does not coincide with the transmission source information 723 (step S1804: NO), the sensor node 102 transmits the transmission request signal S1 in which the sensor node 102 identified by the selected identification information has been set as an intended recipient (step S1805). The sensor node 102 determines whether identification information that has yet to be selected remains (step S1806). If identification information that has yet to be selected remains (step S1806: YES), the sensor node 102 returns to step S1802. On the other hand, if identification information that has yet to be selected does not remain (step S1806: NO), the sensor node 102 ends a series of the operations.

FIG. 19 is a flowchart of an example of a process procedure performed by the management server according to the first example. The management server 101 stands by until a reception or timer event occurs (step S1901). When a timer event occurs, the management server 101 obtains the precision information 820 requested (step S1902). The management server 101 calculates the suspended node count based on the precision information 820 (step S1903). The management server 101 determines suspended nodes (step S1904). The management server 101 transmits to the gateway 301, a transmission request signal S1 that includes the identification information of the determined suspended nodes (step S1905). The management server 101 receives the data of a data signal S2 (step S1906).

The management server 101 analyzes the data (step S1907). The management server 101 determines whether an abnormality has been detected (step S1908). If no abnormality has been detected (step S1908: NO), the management server 101 returns to step S1901. If an abnormality has been detected (step S1908: YES), the management server 101 determines whether to output an alarm, re-measure, or drop a node (step S1909).

If a sensor node 102 that has been determined to have an abnormality is to be dropped (step S1909: drop), the management server 101 stores identification information that identifies the sensor node 102 that is to be dropped (step S1910). The management server 101 transmits a drop request signal S3 to the sensor node 102 that is to be dropped (step S1911), and returns to step S1901.

If an alarm is to be output (step S1909: alarm), the management server 101 outputs an alarm (step S1912), and ends a series of the operations. The form of output of the alarm may be a transmission of an alarm to the user terminal 302, buzzer output, and the like. If re-measurement is to be performed (step S1909: re-measure), the management server 101 changes the required precision indicated by the precision information 820 required (step S1913), and returns to step S1903. When receiving an abnormality notification signal, the management server 101 obtains abnormal information and a measurement value previously received (step S1914), and transitions to step S1907.

In the second example, when a sensor node 102 is included as an intended recipient of a suspension request signal S5, the sensor node suspends transmission and reception operations for a predetermined interval and compares the measurement value thereof and the measurement value measured by another sensor node 102 to detect an abnormality. As a result, decreases in the precision of abnormality detection in the system 100 are suppressed and the volume of signals in the system 100 is reduced, whereby the power consumption of the sensor nodes 102 is reduced. In the second example, components identical to those in the first example are given the same reference numerals used in the first example and detailed description of the functions and components will be omitted hereinafter.

FIG. 20 is a diagram depicting an example of packet configuration of signals according to the second example. In the second example, signals transmitted or received by a sensor node 102 include transmission request signals S1, data signals S2, drop request signals S3, suspension request signals S5, and abnormality notification signals S4. A fundamental format of a packet is identical to the fundamental format of a packet in the first example and therefore, detailed description will be omitted hereinafter. Further, a data signal S2, a drop request signal S3, and an abnormality notification signal S4 in the second example are identical to those in the first example and therefore, detailed description will be omitted hereinafter.

For example, a transmission request signal S1 is a signal by which the management server 101 requests transmission of the measurement values by the sensors 401. A transmission request signal S1 has identification information indicating an intended recipient, identification information indicating the transmission source, information indicating a transmission request, and a request ID. Since the second example further has a suspension request signal S5, a transmission request signal S1 in the second example does not include the suspended node count or the suspended node ID included in a transmission request signal S1 in the first example.

For example, a suspension request signal S5 is a signal by which the management server 101 requests suspension of sensor nodes 102 for a predetermined interval. For example, a suspension request signal S5 has identification information indicating an intended recipient, identification information indicating the transmission source, information indicating a suspension request, a request ID, a suspended node ID, and a suspension period. For example, each sensor node 102 compares the request ID included in a suspension request signal S5 received in the past and the request ID of a suspension request signal S5 newly received. As a result, repeated transfer of the same suspension request signal S5 by a single sensor node 102 can be prevented. The suspension period is a period during which functions of the reception circuit 422 and the transmission circuit 421 of a sensor node 102 are suspended. In a case where the system 100 is operated after a suspension interval is pre-stored in the storage unit 705 (e.g., the RAM 405 or the non-volatile memory 406) of the sensor nodes 102, the suspension period need not be included in the suspension request signal S5.

Figure 21:
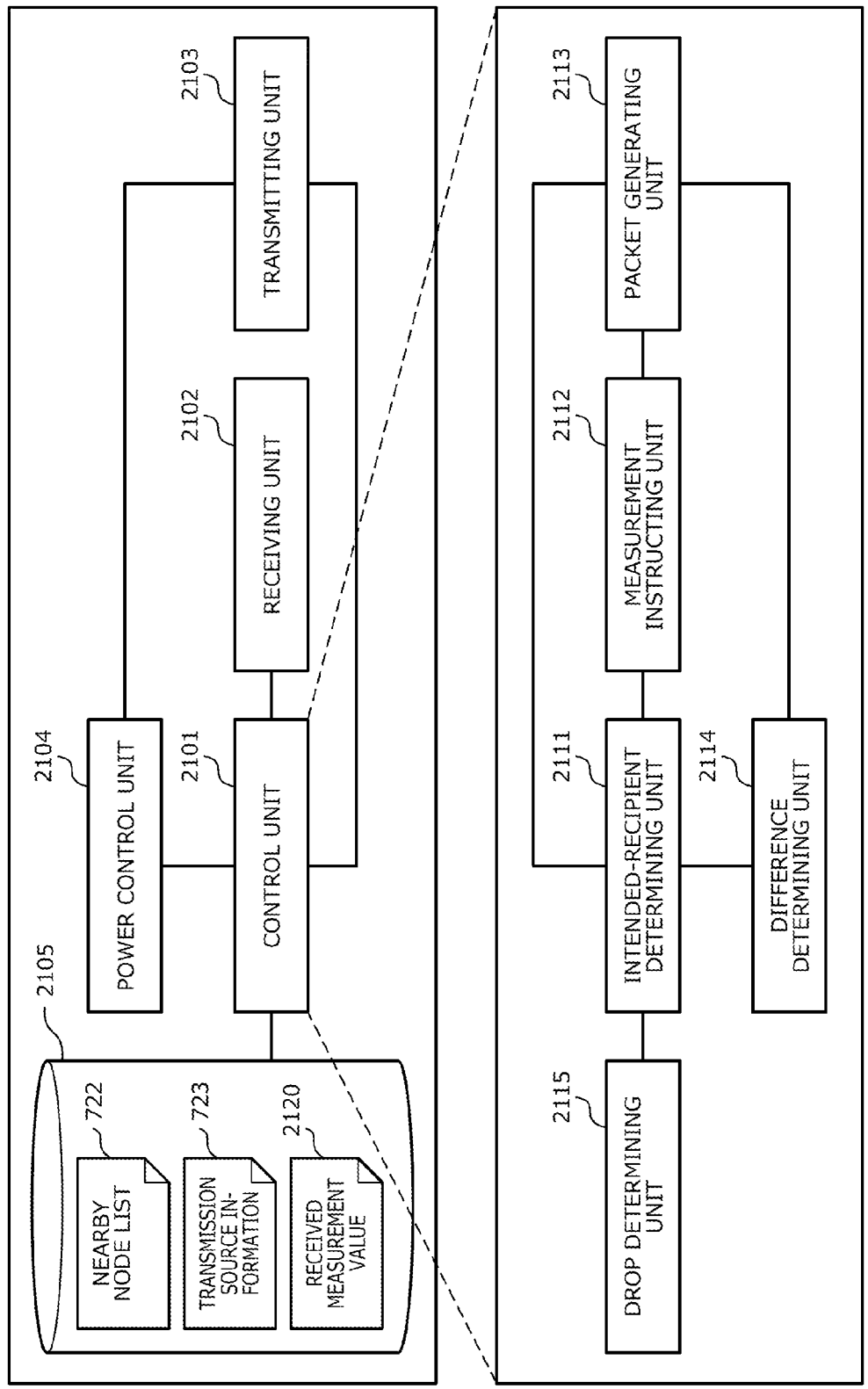
FIG. 21 is a block diagram depicting an example of a functional configuration of a sensor node.

FIG. 21 is a block diagram depicting an example of a functional configuration of a sensor node. The sensor node 102, for example, has a control unit 2101, a receiving unit 2102, and a transmitting unit 2103. The transmitting unit 2103, for example, is the transmission circuit 421 described above. The receiving unit 2102, for example, is the reception circuit 422 described above. A power control unit 2104 is implemented by the power source managing unit 410. The control unit 2101, for example, is implemented by the MCU 402. Further, processes of the control unit 2101, for example, are encoded in programs stored in a storage unit 2105 that can be accessed by the MCU 402. The MCU 402 reads out a program from the storage unit 2105 and executes a process encoded in the programs whereby, processes of the control unit 2101 are implemented. Further, process results of the control unit 2101, for example, are stored to the storage unit 2105 such as the RAM 405, the non-volatile memory 406, and the like.

An example of a functional configuration of the management server 101 according to the second example is identical to that of the management server 101 according to the first example and therefore, detailed description is omitted hereinafter.

The determining unit 811 determines the sensor nodes 102 that are to be prohibited from performing transmission and reception for a predetermined interval. Here, a determination method may be identical to that in the first example. As described, a determined sensor node 102 is a suspended node. The packet generating unit 812 generates a request ID and generates a suspension request signal S5 that includes the generated request ID and identification information indicating the suspended nodes determined by the determining unit 811. For example, an intended recipient of a suspension request signal S5 transmitted from the management server 101 is the aggregator ag. The transmitting unit 803 wirelessly transmits the suspension request signal S5 generated by the packet generating unit 812.

The receiving unit 2102 receives the suspension request signal S5 that is transmitted from the management server 101 and that requests that transmission and reception not be performed during the predetermined interval.

The control unit 2101 determines whether the sensor node 102 is in the first state or the second state. The control unit 2101, when determining the second state, determines whether there is a predetermined difference between data of the sensor 401 thereof and the data of the sensor 401 of a sensor node 102 that is among the sensor nodes 102 and excluding the sensor node 102 of the control unit 2101. More specifically, the control unit 2101 has an intended-recipient determining unit 2111, a measurement instructing unit 2112, a packet generating unit 2113, a difference determining unit 2114, and a drop determining unit 2115.

The drop determining unit 2115 determines whether the sensor node 102 of the drop determining unit 2115 is included as a sensor node 102 to be subject to a suspension request signal S5 and thereby, determines whether the sensor node 102 of the drop determining unit 2115 is in the first state or the second state. The drop determining unit 2115, when determining that the sensor node 102 thereof is to be subject to the suspension request signal S5, determines that the sensor node 102 thereof is in the second state. In contrast, the drop determining unit 2115, when determining that the sensor node 102 thereof is not to be subject to the suspension request signal S5, determines that the sensor node 102 thereof is in the first state.

The power control unit 2104, upon a determination that the sensor node 102 thereof is to be subject to the suspension request signal S5, suspends the power supply of the battery 411 to the receiving unit 2102 and the transmitting unit 2103, from the determination until the elapse of the suspension period. The suspension period is included in the suspension request signal S5. Further, the suspension period is measured by the timer 403.

The measurement instructing unit 2112 requests the sensor 401 thereof to measure for a time interval that is shorter than the suspension period. The difference determining unit 2114 determines whether there is a predetermined difference between the measurement value measured by the sensor 401 thereof and a measurement value stored in the storage unit 2105. The predetermined difference is identical to the example described in the first example and therefore, detailed description is omitted hereinafter. The measurement value stored in the storage unit 2105 is a measurement value included in a data signal S2 received during operation of the receiving unit 2102, or a measurement value measured by another sensor node 102. Further, the measurement value stored in the storage unit 2105 is a measurement value measured by a sensor node 102 indicated by identification information included in the nearby node list 722.

If the difference determining unit 2114 determines that there is a predetermined difference, the packet generating unit 2113 generates an abnormality notification signal S4. A generation example of the abnormality notification signal S4 is identical to that described in the first example and therefore, detailed description is omitted hereinafter.

The receiving unit 2102 further receives a transmission request signal S1 that requests transmission. The intended-recipient determining unit 2111, when the receiving unit 2102 receives the transmission request signal S1, determines whether the sensor node 102 of the intended-recipient determining unit 2111 is included as an intended recipient of the transmission request signal S1. If the intended-recipient determining unit 2111 determines that the sensor node 102 thereof is included, the control unit 2101 stores as the transmission source information 723 to the storage unit 2105, identification information indicating the transmission source of transmission request signal S1. If the intended-recipient determining unit 2111 determines that the sensor node 102 thereof is included, the packet generating unit 2113 generates a transmission request signal S1 in which the communications nodes that can directly communicate with the communications node of the packet generating unit 2113 are set as intended recipients. The transmitting unit 2103 wirelessly transmits the transmission request signal S1 generated by the packet generating unit 2113. Further, when the intended-recipient determining unit 2111 determines that the sensor node 102 thereof is included, the packet generating unit 2113 generates a data signal S2 for which an intended recipient is the transmission source of the transmission request signal S1 and that includes the measurement value measured consequent to an instruction of the measurement instructing unit 2112. The transmitting unit 2103 transmits the data signal S2 generated by the packet generating unit 2113.

The receiving unit 2102 further receives a data signal S2 that notifies the management server 101 of a measurement value. The intended-recipient determining unit 2111, when the receiving unit 2102 receives the data signal S2, determines whether the sensor node 102 of the intended-recipient determining unit 2111 is included as an intended recipient of the data signal S2. If the intended-recipient determining unit 2111 determines that the sensor node 102 thereof is included, the packet generating unit 2113 generates a data signal S2 that is the received data signal S2 in which the intended recipient has been changed to the sensor node 102 indicated by the transmission source information 723 stored in the storage unit 2105. The transmitting unit 2103 transmits the data signal S2 generated by the packet generating unit 2113. Thus, the data signal S2 is transferred by relay.

Further, if the measuring node ID of the data signal S2 received by the receiving unit 2102 is identification information included in the nearby node list 722, the control unit 2101 stores the measurement value included in the data signal S2 to the storage unit 2105. The measurement value included in the data signal S2 is stored to the storage unit 2105 as a received measurement value 2120. Thus, when the sensor node 102 is a suspended node, the received measurement value 2120 stored in the storage unit 2105 is compared with the measurement value measured by the sensor 401 thereof by the difference determining unit 2114.

Figure 22:
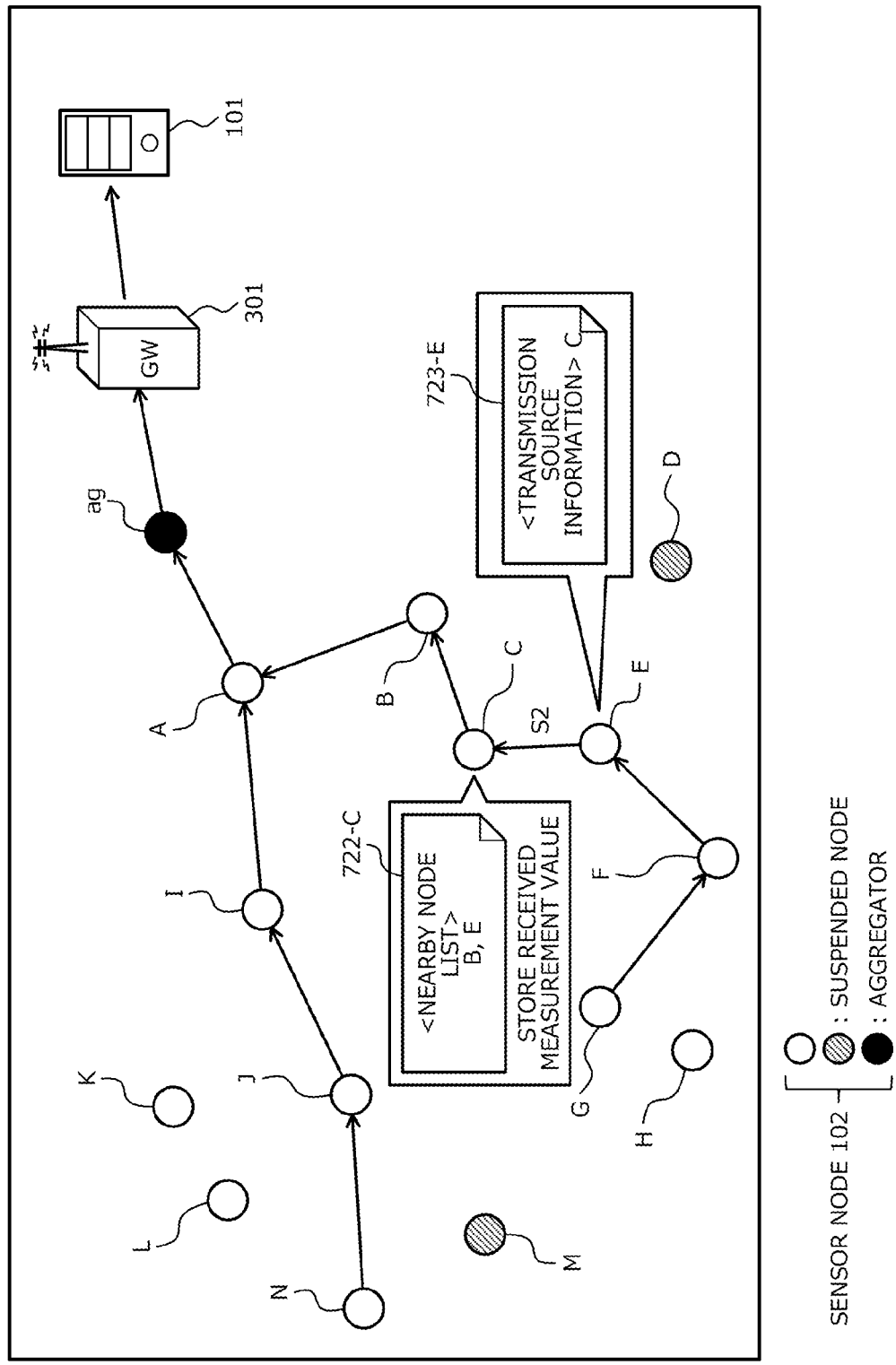
FIG. 22 is a diagram of an example of storage of a measurement value when a data signal is transferred.

FIG. 22 is a diagram of an example of storage of a measurement value when a data signal is transferred. Here, the sensor node 102-C will be described as an example. The receiving unit 2102-C receives a data signal S2 transmitted from the sensor node 102-E. If the measuring node ID of the received data signal S2 is identification information that indicates the sensor node 102-E and is included in the nearby node list 722-C, the control unit 2101-C stores the measurement value included in the data signal S2 to the storage unit 2105-C. Further, as described above, the sensor node 102-C transfers the data signal S2 to the sensor node 102 indicated by the transmission source information 723.

FIG. 23 is a diagram depicting an example of relayed transfer of a suspension request signal. The receiving unit 2102-C receives a suspension request signal S5 from the sensor node 102-B. (1) If the suspended node ID of the suspension request signal S5 indicates the sensor node 102-C, the power control unit 2104-C suspends power supply to the receiving unit 2102-C and the transmitting unit 2103-C, from the determination that the sensor node 102 is indicated until the elapse of the suspension period. As described above, the timer 403 measures the suspension period. As described above, suspension period is specified by the suspension request signal S5. If the suspended node ID of the suspension request signal S5 indicates the sensor node 102-C, the measurement instructing unit 2112-C requests the sensor 401-C to perform measurement. In other words, the measurement instructing unit 2112-C requests the sensor 401-C to perform measurement for a time interval that is shorter than the suspension period. (2) The difference determining unit 2114-C determines whether there is a difference between the measurement value measured by the sensor 401-C and the received measurement value 2120 stored in the storage unit 2105. Processes after determination of whether there is a difference are identical to those of the first example and therefore, detailed description will be omitted hereinafter.

FIG. 24 is an operation sequence diagram of the system according to the second example. FIG. 24 depicts an example where the management server 101 requests suspension of the sensor node 102-B after requesting suspension of the sensor node 102-C. Here, for the ease of understanding, although signals from the management server 101 are depicted to reach the sensor nodes 102 directly, in actuality, the signals reach the intended sensor nodes 102 by relayed transfer. Further, arrows representing data requests from the management server 101 to the sensor node 102-A and arrows representing data transmission from the sensor node 102-A to the management server 101 are omitted.

The management server 101 requests suspension of the sensor node 102-C (step S2401). As a result, the sensor node 102-C suspends power supply to the receiving unit 2102 and the transmitting unit 2103 for the suspension period specified by the suspension request signal S5. The management server 101 requests the sensor nodes 102 to transmit data of the sensors 401 (step S2402). In response, the sensor node 102-A and the sensor node 102-B transmit data of the sensors 401 to the management server 101 (step S2403). The sensor node 102-C is suspended and therefore, does not receive the transmission request signal S1. Similarly, the management server 101 collects the data of the sensors 401 by the operations at steps S2404, S2405, S2406, and S2407.

The management server 101 newly determines suspended nodes, after the suspension period elapses from the transmission of the suspension request signal S5. The management server 101 requests suspension of the sensor node 102-B (step S2408). As a result, the sensor node 102-B suspends power supply to the receiving unit 2102 and the transmitting unit 2103 for the suspension period specified by the suspension request signal S5. The management server 101 requests the sensor nodes 102 to transmit data of the sensors 401 (step S2409). As a result, the sensor node 102-A and the sensor node 102-C transmit data of the sensors 401 to the management server 101 (step S2410). The sensor node 102-B is suspended and therefore, does not receive the transmission request signal S1. Similarly, the management server 101 collects the data of the sensors 401 by the operations at steps S2411, S2412, S2413, and S2414.

If the receiving units 2102 of the suspended nodes remain suspended, when the suspension is released by the management server 101, the release request cannot be received. Therefore, the sensor nodes 102 resume power supply to the receiving unit 2102 after the specified suspension period elapses. Power supply to the transmitting unit 2103 may be provided when transmission operations are performed.

FIGS. 25, 26, and 27 are flowcharts of an example of a process procedure performed by the sensor node according to the second example. The sensor node 102, when activated, performs initialization (step S2501). More specifically, initialization represents supplying power to the receiving unit 2102. The sensor node 102 stands by until a reception event occurs (step S2502).

When a reception event occurs, the sensor node 102 determines whether the sensor node 102 is included as an intended recipient of the received signal (step S2503). If the sensor node 102 is included as an intended recipient (step S2503: YES), the sensor node 102 the sensor node 102 determines whether the type of the received signal is a transmission request (step S2504). If the signal is a transmission request (step S2504: YES), the sensor node 102 determines based on the request ID, whether the same transmission request has already been received (step S2505).

If the same transmission request has already be received (step S2505: YES), the sensor node 102 returns to step S2502. If the same transmission request has not already be received (step S2505: NO), the sensor node 102 associates and stores the request ID with transmission source node ID as the transmission source information 723 (step S2506). The sensor node 102 performs a transfer process of the transmission request signal S1 (step S2507). The sensor node 102 performs measurement by the sensor 401 (step S2508). The sensor node 102 transmits a data signal S2 that includes the measurement value and for which the transmission source of the received transmission request signal S1 is set as an intended recipient (step S2509), and returns to step S2502. Although not depicted, the sensor node 102 starts power supply to the transmitting unit 2103 before transmitting the data signal S2 and suspends the power supply to the transmitting unit 2103 after transmitting the data signal S2.

At step S2503, if the sensor node 102 is not included as an intended recipient (step S2503: NO), the sensor node 102 determines whether the received signal is for data transmission (step S2510). If the received signal is not a data transmission request (step S2510: NO), the sensor node 102 returns to step S2502.

If the received data is a data transmission request (step S2510: YES), the sensor node 102 determines whether the transmission source and the measuring node coincide (step S2511). If the transmission source and the measuring node do not coincide (step S2511: NO), the sensor node 102 returns to step S2502. If the transmission source and the measuring node coincide (step S2511: YES), the sensor node 102 stores the received measurement value (step S2512), and returns to step S2502.

At step S2504, if the received signal is not a transmission request (step S2504: NO), the sensor node 102 determines whether the received signal is a drop request (step S2601). If the received signal is not a drop request (step S2601: NO), the sensor node 102 determines whether the received signal is a suspension request (step S2602). If the received signal is not a suspension request (step S2602: NO), the sensor node 102 sets the transmission source indicated by the transmission source information 723 stored in the storage unit 2105 to be an intended recipient and transmits the received signal (step S2603); and returns to step S2502. At step S2602, in a case of "NO", the received signal is for data transmission or abnormality notification.

If the received signal is a drop request (step S2601: YES), the sensor node 102 determines whether the sensor node 102 is to be dropped (step S2604). If the sensor node 102 is to be dropped (step S2604: YES), the sensor node 102 suspends the timer 403 (step S2605) whereby, the sensor node 102 is suspended, ending a series of the operations.

If the sensor node 102 is not to be dropped (step S2604: NO), the sensor node 102 determines whether the same signal has already be received (step S2606). If the signal has already be received (step S2606: YES), the sensor node 102 returns to step S2502. If the signal has not already been received (step S2606: NO), the sensor node 102 transmits the drop request signal S3 to nearby sensor nodes 102 (step S2607), and returns to step S2502.

At step S2602, if the received signal is a suspension request (step S2602: YES), the sensor node 102 determines whether the sensor node 102 is to be suspended (step S2701). If the sensor node 102 is not to be suspended (step S2701: NO), the sensor node 102 determines whether the same signal has already be received (step S2702). If the signal has already been received (step S2702: YES), the sensor node 102 returns to step S2502. If the signal has not already been received (step S2702: NO), the sensor node 102 stores suspended nodes among nearby sensor nodes 102, as being subject to the suspension (step S2703). A nearby sensor node 102 is a sensor node 102 indicated by the identification information included in a nearby sensor node 102. The sensor node 102 transmits the suspension request signal S5 to the nearby sensor nodes 102 (step S2704), and returns to step S2502.

If the sensor node 102 is to be suspended (step S2701: YES), the sensor node 102 suspends the power supply to the reception circuit 422 (step S2705). The sensor node 102 sets the timer 403 to measure a cycle (step S2706). The sensor node 102 sets the timer 403 to measure the suspension period included in the suspension request signal S5 (step S2707). The sensor node 102 stands by until a timer event (step S2708).

The sensor node 102 compares a threshold or the received measurement value 2120 stored in the storage unit 2105 and the measured measurement value (step S2709). For example, the sensor node 102 determines whether there is a predetermined difference between the received measurement value 2120 and the measured measurement value. The sensor node 102 determines whether an abnormality has been detected (step S2710). For example, the sensor node 102 when determining that there is a predetermined difference, determines that an abnormality has been detected and the sensor node 102, when determining that there is no predetermined difference, determines that no abnormality has been detected.

If an abnormality has been detected (step S2710: YES), the sensor node 102 transmits an abnormality notification signal S4 (step S2711). The sensor node 102 resumes power supply to the reception circuit 422 (step S2712), and returns to step S2502. If no abnormality has been detected (step S2710: NO), the sensor node 102 stores the measurement value (step S2713), and returns to step S2708.

FIG. 28 is a flowchart of an example of a procedure of the transfer process of a transmission request signal depicted in FIG. 25. The sensor node 102 obtains the nearby node list (step S2801). The sensor node 102 selects identification information of a node from the nearby node list (step S2802). The sensor node 102 determines whether the sensor node 102 indicated by the selected identification information is a suspended node indicated by identification information stored concerning suspension at step S2703 (step S2803).

If the indicated sensor node 102 is a suspended node (step S2803: YES), the sensor node 102 transitions to step S2806. If the indicated sensor node 102 is not a suspended node (step S2803: NO), the sensor node 102 determines whether the selected identification information is the transmission source information 723 (step S2804). If the selected identification information is the transmission source information 723 (step S2804: YES), the sensor node 102 returns to step S2802.

If the selected identification information is not the transmission source information 723 (step S2804: NO), the sensor node 102 sets the sensor node 102 indicated by the selected identification information as an intended recipient and transmits a transmission request signal S1 (step S2805). The sensor node 102 determines whether an unselected sensor node 102 remains (step S2806). If an unselected sensor node 102 remains (step S2806: YES), the sensor node 102 returns to step S2802. On the other hand, if no unselected sensor node 102 remains (step S2806: NO), the sensor node 102 ends a series of the operations.

FIG. 29 is a flowchart of an example of a process procedure performed by the management server according to the second example. The management server 101 stands by until a reception or a timer event occurs (step S2901). When a timer event, which is the elapse of a suspension interval, occurs, the management server 101 obtains the precision information 820 requested (step S2902). The management server 101 calculates the suspended node count based on the precision information 820 requested (step S2903).

The management server 101 determines the suspended nodes (step S2904). For example, the management server 101 randomly determines the suspended nodes. The management server 101 transmits a suspension request signal S5 (step S2905), and returns to step S2901. When a timer event for cyclic measurement occurs, the management server 101 transmits a transmission request signal S1 to the gateway 301 (step S2906). The management server 101 obtains the data of data signals S2 (step S2907). The management server 101 performs data analysis (step S2908).

The management server 101 determines whether an abnormality has been detected (step S2910). If no abnormality has been detected (step S2910: NO), the management server 101 returns to step S2901. If an abnormality has been detected (step S2910: YES), the management server 101 determines whether to output an alarm, re-measure, or drop a node (step S2911).

If a sensor node 102 that has been determined to have an abnormality is to be dropped (step S2911: drop), the management server 101 stores identification information that identifies the sensor node 102 that is to be dropped (step S2912). The management server 101 transmits a drop request signal S3 to the sensor node 102 that is to be dropped (step S2913), and returns to step S2901.

If an alarm is to be output (step S2911: alarm), the management server 101 outputs an alarm (step S2914), and ends a series of the operations. The form of output of the alarm may be a transmission of an alarm to the user terminal 302, buzzer output, and the like. If re-measurement is to be performed (step S2911: re-measure), the management server 101 changes the required precision indicated by the precision information 820 requested (step S2915), and returns to step S2902.

After step S2901, when an reception event of an abnormality notification signal S4 occurs, the management server 101 obtains the detected abnormal value and a previously received measurement value (step S2909), and transitions to step S2908.

As described, in the system according to the present embodiment, transmission of measurement values in response to a transmission request is suspended for a portion of the sensor nodes and each suspended node determines whether there is an abnormality from the measurement value thereof and notifies a communications apparatus when there is an abnormality. As a result, the precision of abnormality detection can be improved and power consumption can be reduced.

Further, the sensor node according to the present embodiment detects an abnormality by comparing the measurement value of the sensor node and the measurement value included in a data signal, when the sensor node is included as an intended recipient of the data signal giving notification to the management server 101. As a result, the precision of abnormality detection can be improved and power consumption can be reduced.

Further, the sensor node determines whether there is a predetermined difference between the measurement value thereof and the measurement value included in a data signal, when a sensor node that measured the measurement value included in the data signal is a sensor node with which direct communication is possible. As a result, the measurement value of a closer sensor node can be compared, enabling the precision of abnormality detection to be improved.

Further, when the sensor node is included as an intended recipient of a transmission request signal that includes a suspended node ID, the sensor node transmits the received transmission request signal and a data signal that gives notification of the measurement value and has intended recipients that exclude the suspended node ID. As a result, the transmission request signal can be relay transferred by multihop communication between sensor nodes and the data signal can be transmitted to the management server.

Further, the sensor node wirelessly transmits a data signal for which an intended recipient is the transmission source of a transmission request signal. As a result, a data signal that corresponds to a transmission request signal transmitted by relayed transfer can be relay transferred by the reverse path.

Further, a portion of the sensor nodes detect an abnormality by comparing the measurement value thereof and a measurement value received from another sensor node. As a result, the volume of communication in the system is reduced and measurement values between different sensor nodes can be compared. Therefore, decreases in the precision of abnormality detection can be suppressed and power consumption can be reduced.

Further, the sensor node, when included as an intended recipient of a suspension request signal, suspends transmission and reception operations and detects for an abnormality by comparing the measurement value measured thereby and a measurement value measured by another sensor node and previously received. As a result, the precision of abnormality detection can be improved and power consumption can be reduced.

Further, consequent to a suspension request signal, the sensor node refrains from performing transmission operations and reception operations for a suspension period included in the suspension request signal. As a result, reception and transmission operations can be resumed. Therefore, suspended nodes need not be fixed.

Further, when a sensor node that measured the measurement value included in a received data signal is a sensor node with which direct communication is possible, the sensor node stores the measurement value included in the data signal to the storage unit.

Further, to refrain from performing transmission and reception operations for a predetermined period, the sensor node suspends power supply to the transmitting unit and the receiving unit. As a result, power consumption can be further reduced.

The determining method described in the present embodiment may be implemented by executing a prepared program on the sensor node 102. The program is stored to a recording medium that can be read by the MCU 402 such as the non-volatile memory 406, and is read out and executed by the MCU 402. The program may be distributed by wireless communication by the management server 101.

According to one aspect of the present invention, the precision of abnormality detection can be improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A system comprising:
a plurality of communications nodes, respectively having a sensor; and
a communications apparatus configured to simultaneously request the plurality of communications nodes to transmit sensor data, wherein
the communications apparatus transmits to the plurality of communications nodes, a suspension request signal that requests a portion of the plurality of communications nodes to refrain from performing transmission and reception operations, and,
a first communications node among the plurality of the communications nodes:
receives the suspension request signal;
determines according to whether the first communications node is included among the portion of the plurality of communications nodes not to perform the transmission and reception operations consequent to the received suspension request signal, whether the first communications node is in a first state where the communications apparatus includes the first communications node when requesting transmission or a second state where the communications apparatus excludes the first communications node when requesting transmission;
receives from a second communications node among the plurality of communications nodes when the first communications node determines to be in the first state, a data signal that notifies the communications apparatus of the sensor data of the second communications node;
stores to a storage device, the sensor data included in the received data signal, when determining to be in the first state;
wirelessly transmits when determining to be in the first state, the data signal in which a third communications node that is among the plurality of communications nodes and directly communicates with the first communications node is set as an intended recipient;
refrains from performing the transmission and reception operations, when determining to be in the second state; and
determines whether a predetermined difference is present between the sensor data stored in the storage device or a predetermined value and the sensor data of the first communications node, when determining to be in the second state; and
transmits a notification signal that notifies the communications apparatus of the predetermined difference, when determining that the predetermined difference is present.

2. The system according to claim 1, wherein
the suspension request signal has information that indicates a period during which the transmission and reception operations are not to be performed,
the first communications node refrains from performing the transmission and reception operations during the period indicated by the information included in the suspension request signal.

3. The system according to claim 1, wherein
the first communications node stores the sensor data included in the received data signal to the storage device, when the second communications node that measured the sensor data in the received data signal communicates directly with the first communications node.

4. A first communications node included among a plurality of communications nodes that respectively have a sensor, the first communications node comprising:
a receiving circuit configured to receive from a communications apparatus that simultaneously requests the plurality of communications nodes to transmit sensor data, a suspension request signal that requests a portion of the plurality of communications nodes to refrain from performing transmission and reception operations;
a control circuit configured to:
determine according to whether the first communications node is included among the portion of the plurality of communications nodes not to perform the transmission and reception operations consequent to the suspension request signal received by the receiving circuit, whether the first communications node is in a first state where the communications apparatus includes the first communications node when requesting transmission or a second state where the communications apparatus excludes the first communications node when requesting transmission; and determine, when determining the first communications node to be in the second state, whether a predetermined difference is present between a predetermined value and sensor data of the first communications node; and a transmitting circuit configured to wirelessly transmit a notification signal that notifies the communications apparatus of the predetermined difference when the control circuit determines that the predetermined difference is present, wherein the receiving circuit, when the control circuit determines the first communications node to be in the first state, receives from a second communications node among the plurality of communications nodes, a data signal that notifies the communications apparatus of sensor data of the second communications node, the control circuit, when determining the first communications node to be in the first state, stores the sensor data included in the received data signal to a storage device, the control circuit, when determining the first communications node to be in the first state, wirelessly transmits the data signal in which a third communications node that is among the plurality of communications nodes and communicates directly with the first communications node is set as an intended recipient, and the control circuit, when determining the first communications node to be in the second state, determines whether the predetermined difference is present between the sensor data stored in the storage device and the sensor data of the first communications node.

5. The first communications node according to claim 4, further comprising:

a power control circuit configured to supply power to the transmitting circuit when transmitting the notification signal and to suspend power to the transmitting circuit when not transmitting the notification signal, when the first communications node is in the second state.

6. A determining method of a first communications node included among a plurality of communications nodes respectively having a sensor, the method comprising:

receiving from a communications apparatus that simultaneously requests the plurality of communications nodes to transmit sensor data, a suspension request signal that requests a portion of the plurality of communications nodes to refrain from performing transmission and reception operations;

determining according to whether the first communications node is included among the portion of the plurality of communications nodes not to perform the transmission and reception operations consequent to the received suspension request signal, whether the first communications node is in a first state where the communications apparatus includes the first communications node when requesting transmission or a second state where the communications apparatus excludes the first communications node when requesting transmission;

receiving from a second communications node among the plurality of communications nodes when the first communications node is determined to be in the first state, a data signal that notifies the communications apparatus of sensor data of the second communications node;

storing to a storage device, the sensor data included in the received data signal, when the first communications node is determined to be in the first state;

wirelessly transmitting when the first communications node is determined to be in the first state, the data signal in which a third communications node that is among the plurality of communications nodes and directly communicates with the first communications node is set as an intended recipient;

refraining from performing the transmission and reception operations, when the first communications node is determined to be in the second state;

determining whether a predetermined difference is present between the sensor data stored in the storage device and the sensor data of the first communications node, when the first communications node is determined to be in the second state; and transmitting a notification signal that notifies the communications apparatus of the predetermined difference, when the predetermined difference is present.

* * * * *